US 12,472,849 B2

(12) United States Patent
Legh et al.

(10) Patent No.: US 12,472,849 B2
(45) Date of Patent: Nov. 18, 2025

(54) SEAT ASSEMBLY

(71) Applicant: Lear Corporation, Southfield, MI (US)

(72) Inventors: Darren Legh, Wolverhampton (GB); Justin Meredith, Coventry (GB); James King, Coventry (GB); Kevin Farley, Newcastle-upon-Tyne (GB); Jake Collins, Coventry (GB); Myriam Molina, Coventry (GB); Chris J. Edwards, Burton-on-Trent (GB)

(73) Assignee: Lear Corporation, Southfield, MI (US)

( * ) Notice: Subject to any disclaimer, the term of this patent is extended or adjusted under 35 U.S.C. 154(b) by 311 days.

(21) Appl. No.: 17/954,934

(22) Filed: Sep. 28, 2022

(65) Prior Publication Data
US 2024/0067052 A1 Feb. 29, 2024

Related U.S. Application Data

(60) Provisional application No. 63/402,635, filed on Aug. 31, 2022.

(51) Int. Cl.
*B60N 2/02* (2006.01)
*B60N 2/838* (2018.01)
*B60N 2/90* (2018.01)

(52) U.S. Cl.
CPC ......... *B60N 2/0252* (2013.01); *B60N 2/0284* (2013.01); *B60N 2/838* (2018.02); *B60N 2/995* (2018.02)

(58) Field of Classification Search
CPC .... B60N 2/0252; B60N 2/0284; B60N 2/838; B60N 2/995; B60N 2/067; B60N 2/1803; B60N 2/1839; B60N 2/185; B60N 2/2213; B60N 2/34; B60N 2/853

USPC ........... 701/49; 297/344.15, 344.17, 423.25, 297/423.29
See application file for complete search history.

(56) References Cited

U.S. PATENT DOCUMENTS

| | | |
|---|---|---|
| 6,578,917 B1 | 6/2003 | Aubert |
| 8,616,645 B2 | 12/2013 | Sadao |
| 9,326,608 B1 | 5/2016 | Hoy |

(Continued)

FOREIGN PATENT DOCUMENTS

| | | |
|---|---|---|
| CN | 110481392 A | 11/2019 |
| CN | 112716190 A | 4/2021 |

(Continued)

OTHER PUBLICATIONS

"Benefits of a Zero Gravity Bed"; https://amerisleep.com/blog/benefits-of-a-zero-gravity-bed/; last updated Aug. 20, 2022.

(Continued)

*Primary Examiner* — Michael C Zarroli
*Assistant Examiner* — Ellis B. Ramirez
(74) *Attorney, Agent, or Firm* — Fishman Stewart PLLC

(57) ABSTRACT

A seat assembly comprises a seat adjuster; and a seat including: a seat bottom connectable to a track assembly; a seatback pivotably connected to the seat bottom; a calf rest pivotably connected to the seat bottom; and a headrest pivotably connected to the seatback. The seat adjuster includes one or more motors and is connected to the seat to adjust the seat to a first seat position and to a second seat position via adjusting the seatback, the calf rest, and the headrest about a plurality of pivot axes.

19 Claims, 22 Drawing Sheets

(56) References Cited

U.S. PATENT DOCUMENTS

| | | |
|---|---|---|
| 9,714,095 B2 | 7/2017 | Erhel |
| 10,052,976 B2 | 8/2018 | Atger |
| 10,081,270 B1 | 9/2018 | Line |
| 10,266,271 B2 | 4/2019 | Udriste |
| 10,507,744 B2 | 12/2019 | Kim |
| 10,829,014 B2 | 11/2020 | Sivaraj |
| 10,829,222 B2 | 11/2020 | De La Garza |
| 10,933,770 B2 | 3/2021 | Goto |
| 11,065,996 B2 | 7/2021 | Sadao |
| 11,273,736 B2 | 3/2022 | Salvia, III |
| 2005/0127776 A1* | 6/2005 | Greene .................. H02K 23/66 |
| 2008/0255734 A1* | 10/2008 | Altshuller ............ B60N 2/0244 |
| 2015/0008713 A1* | 1/2015 | Erhel ................ B64D 11/06395 |
| 2015/0108816 A1* | 4/2015 | Dry ........................ B60N 2/62 |
| 2016/0264022 A1 | 9/2016 | Mizutani |
| 2017/0341752 A1 | 11/2017 | Verny |
| 2018/0022246 A1* | 1/2018 | Patrick ................. B60N 2/0022 |
| 2018/0228290 A1* | 8/2018 | Kiwak ...................... A61G 5/14 |
| 2019/0152606 A1* | 5/2019 | De La Garza ....... B64D 11/064 |
| 2020/0139853 A1* | 5/2020 | Nawrocki .............. B60N 2/865 |
| 2020/0223326 A1 | 7/2020 | Tanaka |
| 2020/0223342 A1 | 7/2020 | Ito |
| 2020/0398712 A1 | 12/2020 | Moulin |
| 2020/0407067 A1 | 12/2020 | Koustubhan |
| 2021/0070200 A1 | 3/2021 | Jung |
| 2022/0001992 A1* | 1/2022 | Heinen .............. B64D 11/0604 |
| 2024/0017646 A1 | 1/2024 | Hofmann |

FOREIGN PATENT DOCUMENTS

| | | |
|---|---|---|
| CN | 213442190 U | 6/2021 |
| CN | 113352961 A | 9/2021 |
| CN | 113844342 A | 12/2021 |
| DE | 19853156 B4 | 5/2000 |
| DE | 102007052727 A1 | 5/2009 |
| DE | 102009020659 A1 | 11/2010 |
| DE | 102016002516 A1 | 9/2016 |
| DE | 102020207409 A1 | 12/2020 |
| DE | 102020209360 A1 | 3/2021 |
| DE | 102020128906 A1 | 5/2022 |
| JP | 2005289133 A * | 10/2005 |
| JP | 2009096423 A | 5/2009 |
| WO | 2013167822 A1 | 11/2013 |
| WO | 2020094682 A1 | 5/2020 |
| WO | 2021036221 A1 | 3/2021 |
| WO | 2022109180 A1 | 5/2022 |

OTHER PUBLICATIONS

"NASA Standards Inform Comfortable Car Seats"; https://spinoff.nasa.gov/Spinoff2013/t_4.html; 2013.
"7 Benefits of Sleeping in Zero Gravity Position"; https://www.zinus.com/blog/7-benefits-of-sleeping-in-zero-gravity-position; publicly available at least early as Aug. 30, 2022.
"Auto Seat Design for Comfort and Speed to Market"; Jan. 27, 2011.
German Office Action, DE10 2023 120 202.2, dated Mar. 27, 2024 (w_translation).
German Office Action, DE 10 2023 122 404.2, dated Apr. 11, 2024 (w_translation).
NASA: Anthropometry and biomechanics. In: Man-systems integration standards : NASA-STD-3000. revison B. 1995 (Man-systems integration standards ; 1). 81 S.
German Office Action, DE 10 2023 121 390.3, dated Apr. 9, 2024 (w_translation).

* cited by examiner

SEAT ASSEMBLY

CROSS-REFERENCE TO RELATED APPLICATION

This application claims the benefit of and priority to U.S. Provisional Patent Application Ser. No. 63/402,635, filed on Aug. 31, 2022, the disclosure of which is hereby incorporated by reference in its entirety as though fully set forth herein.

TECHNICAL FIELD

The present disclosure generally relates to seat assemblies, including seat assemblies for vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Figure 1:
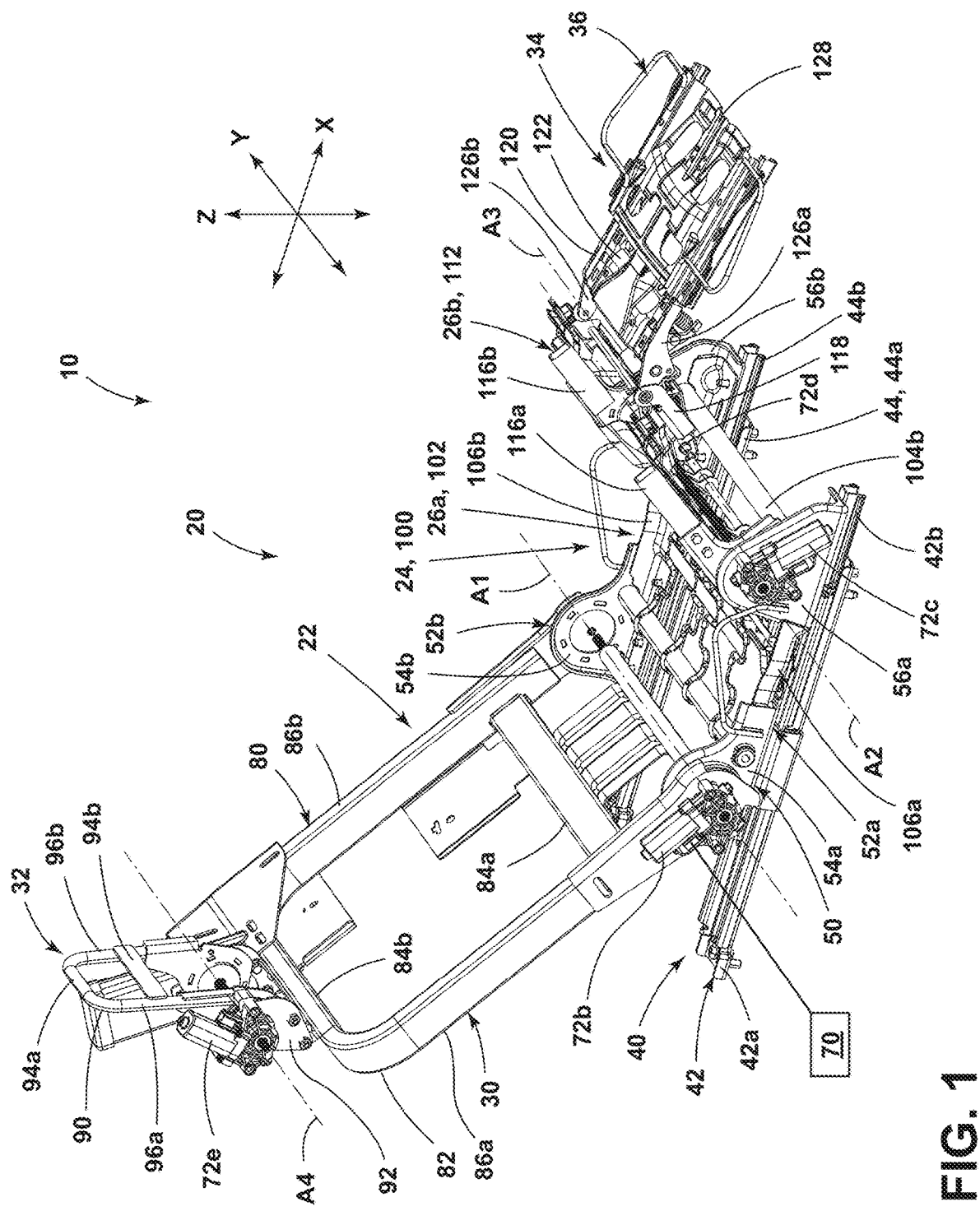
FIGS. 1-3 are perspective views generally illustrating an embodiment of a seat assembly including a seat disposed in a first seat position according to teachings of the present disclosure.
Figure 2:
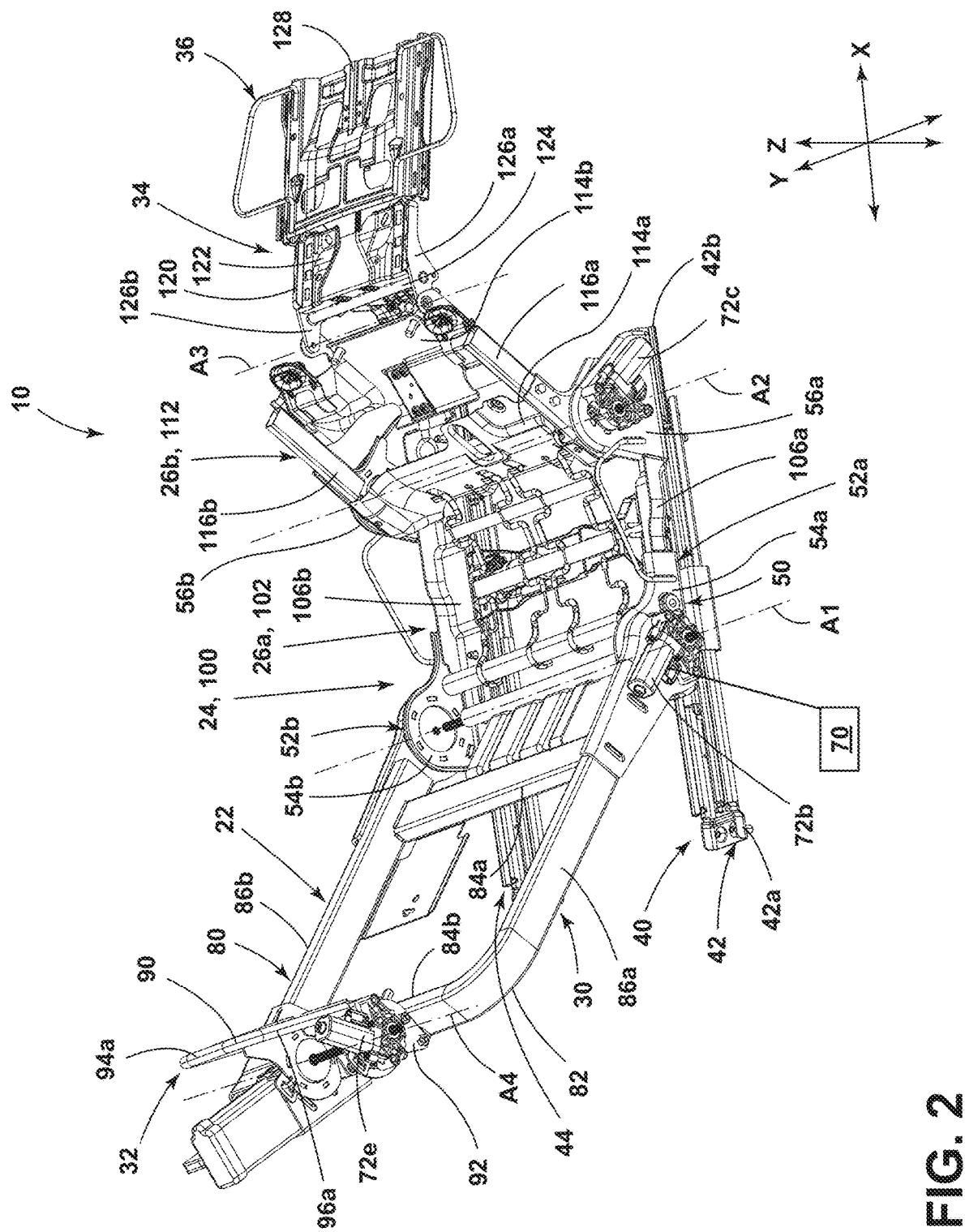
Figure 3:
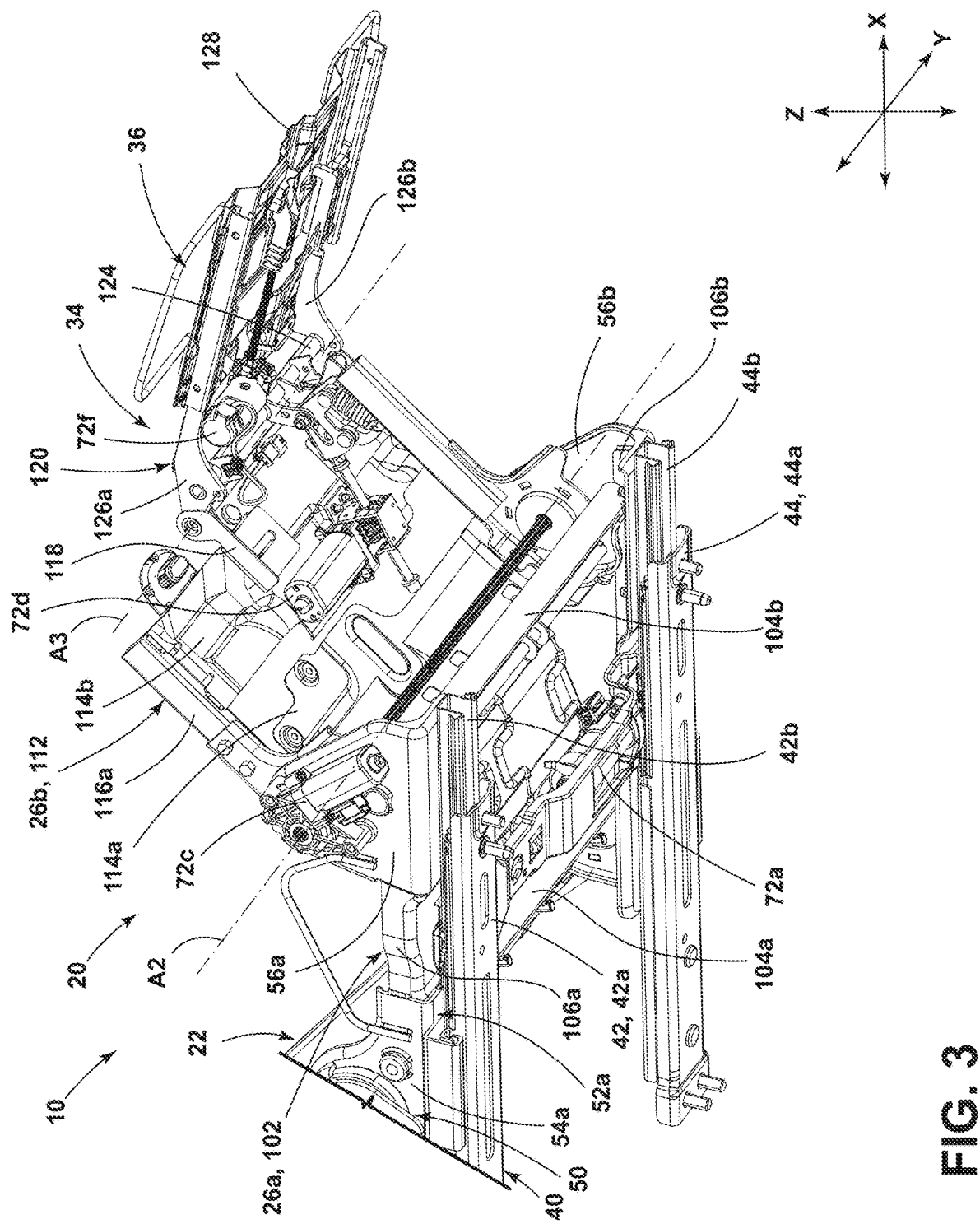
Figure 4:
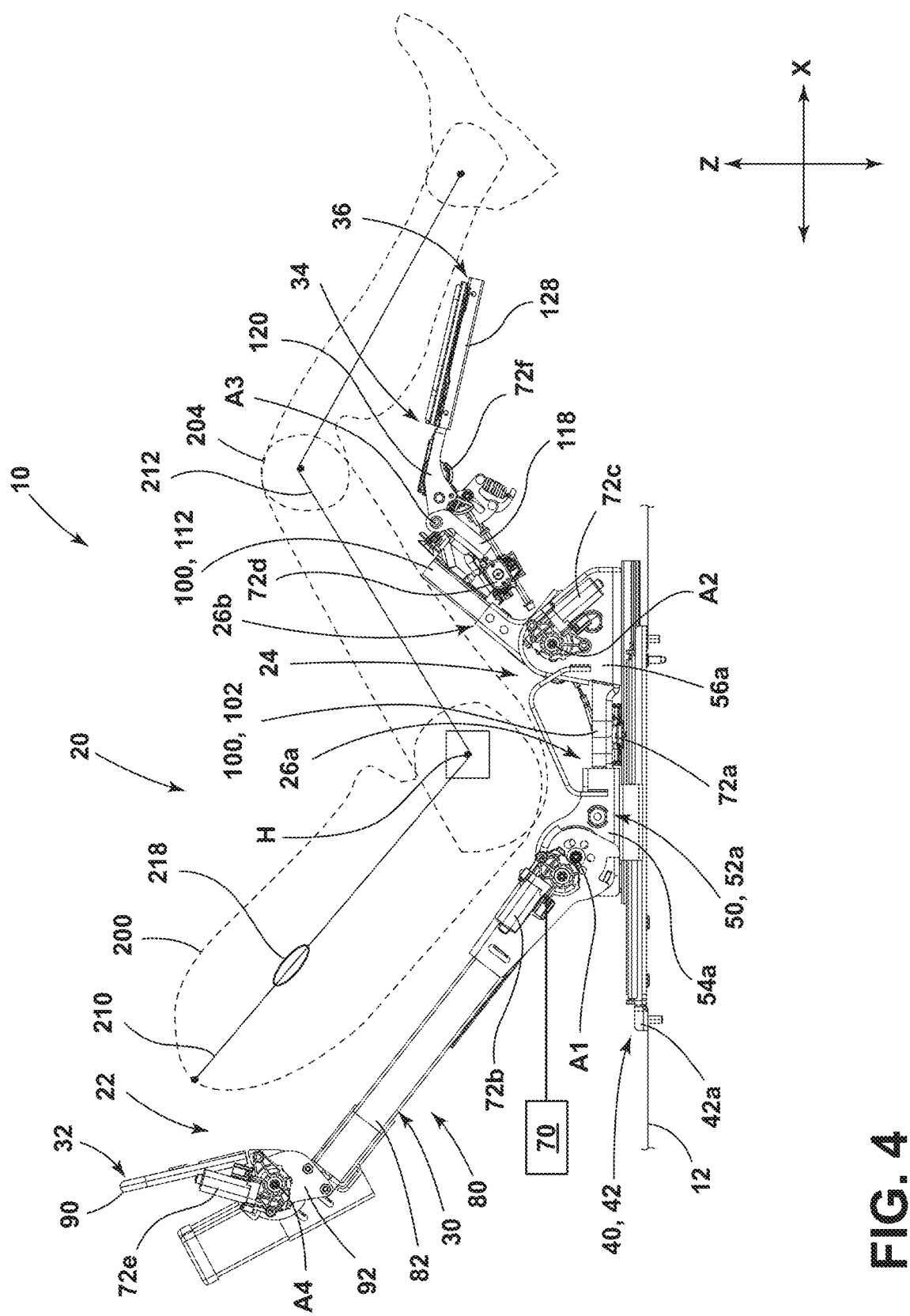
FIGS. 4-6 are side views generally illustrating an embodiment of a seat assembly including a seat disposed in a second seat position according to teachings of the present disclosure.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Referring to FIGS. 1-20, a seat assembly 20, 20' is a modular seat assembly that includes a plurality of components which, when assembled, form a vehicle seat 22, 22', such as for a passenger vehicle 10 (e.g., cars, vans, SUVs, trucks, buses, trains, boats, ships, planes). The seat assembly 20, 20' may be utilized in any other appropriate situation or apparatus, such as homes, office buildings, theaters, stadiums, recreational vehicles, commercial vehicles, and/or agricultural equipment, among others.

The seat assembly 20, 20' includes a seat 22, 22', a track assembly 40, a seat base 50, and a seat adjuster 70. The seat 22, 22' includes a seat frame 80, a seat bottom 24, 24', a seatback 30, a headrest 32, a calf rest 34, and a calf rest extension 36. The seat bottom 24, 24', the seatback 30, the headrest 32, and the calf rest 34 include one or more other elements, components, and/or assemblies, such as a pad or cushion, a trim assembly, a support/suspension mat, air bladders, and/or air distributors (e.g., an air conducting layer, a duct, a fan). Portions of the seat 22, 22' are configured to move relative to one another (e.g., adjust, recline, rotate, fold, collapse) and/or along the track assembly 40 via actuation of the seat adjuster 70. The seat adjuster 70 is configured to adjust the seat 22, 22' to one or more seat positions, including a first seat position (e.g., a design position) and a second seat position (e.g., a zero-gravity position).

Figure 5:
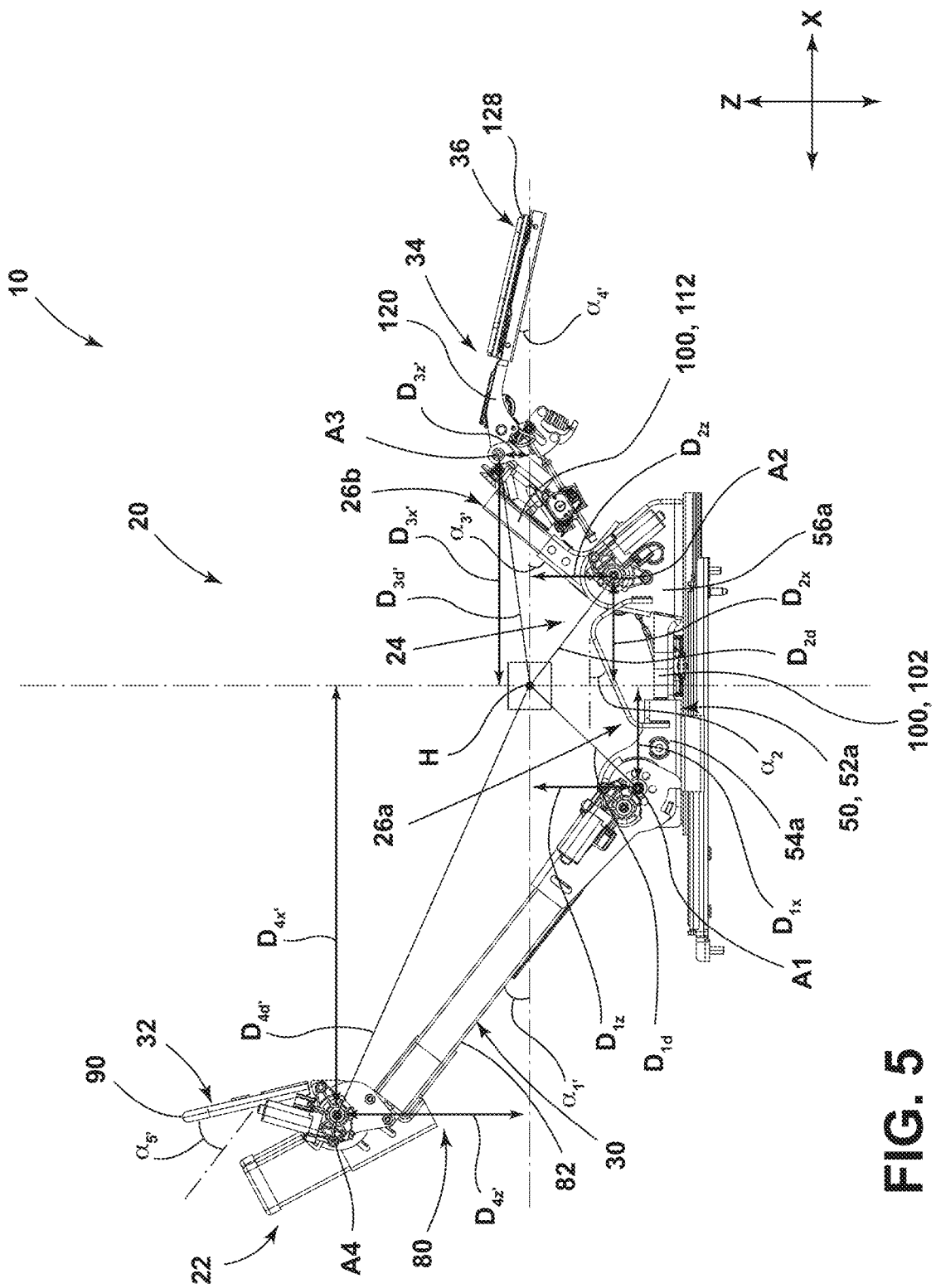
Figure 6:
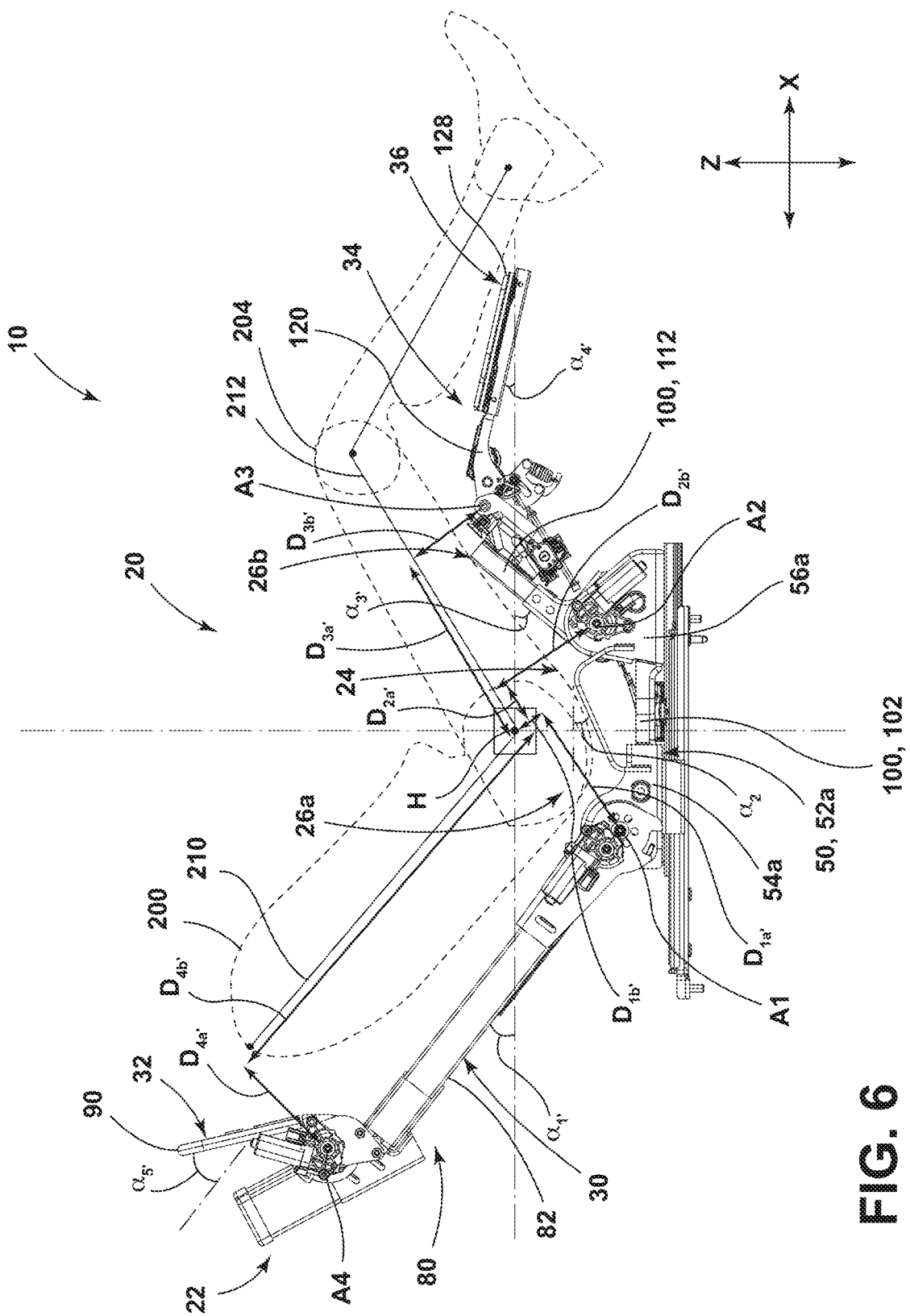
Figure 7:
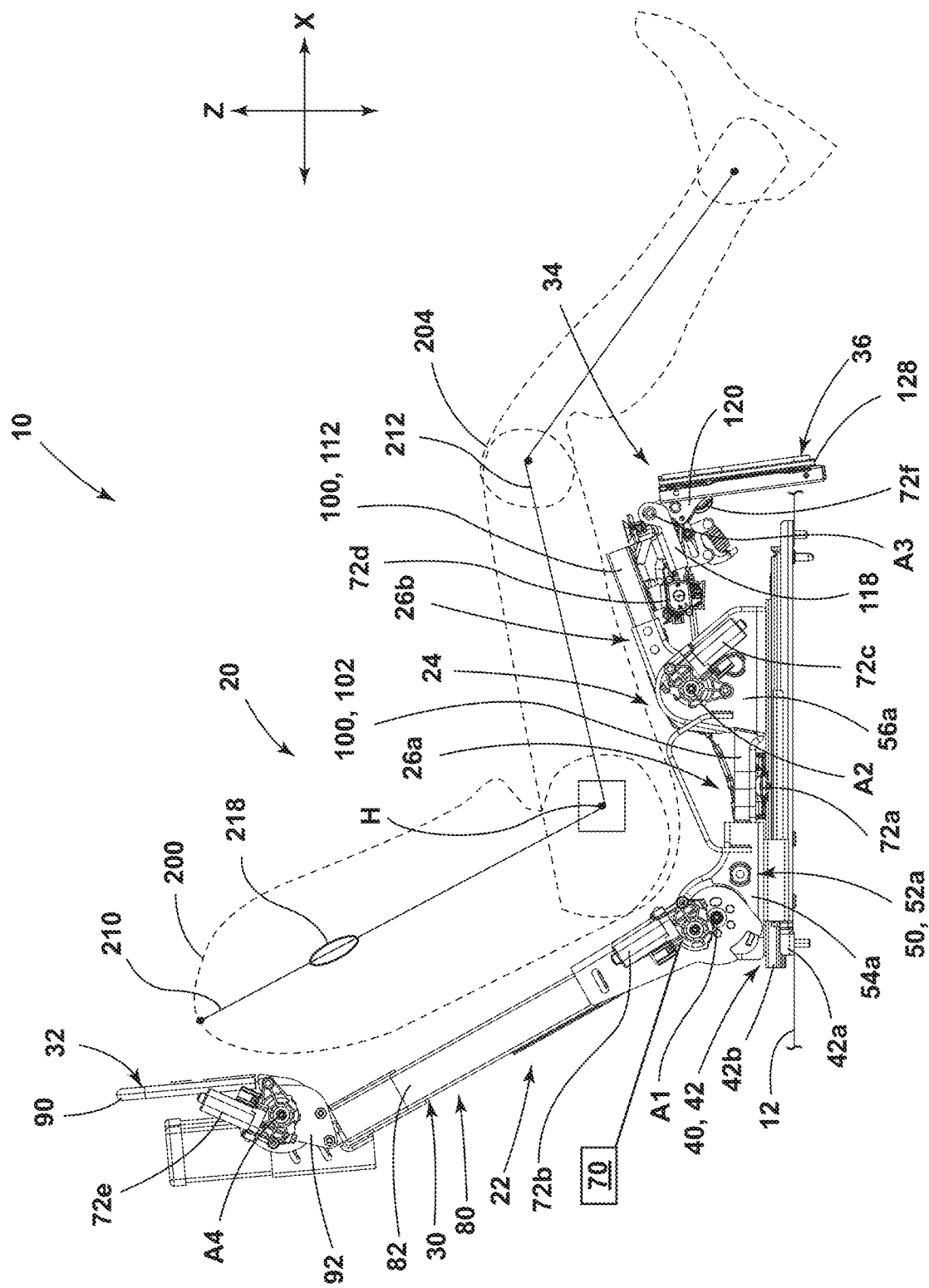
FIGS. 7-9 are side views generally illustrating an embodiment of a seat assembly including a seat disposed in a first seat position according to teachings of the present disclosure.
Figure 8:
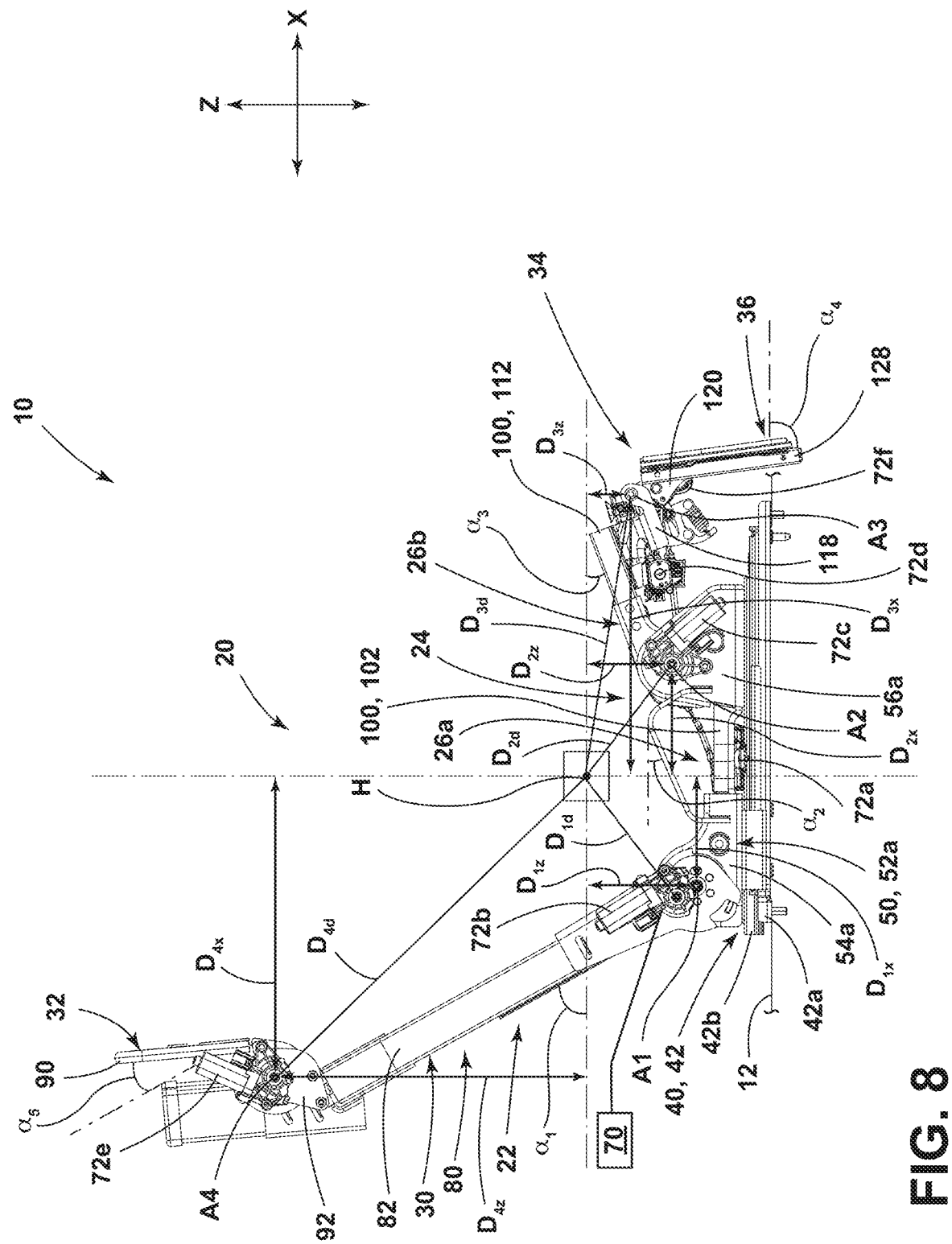
Figure 9:
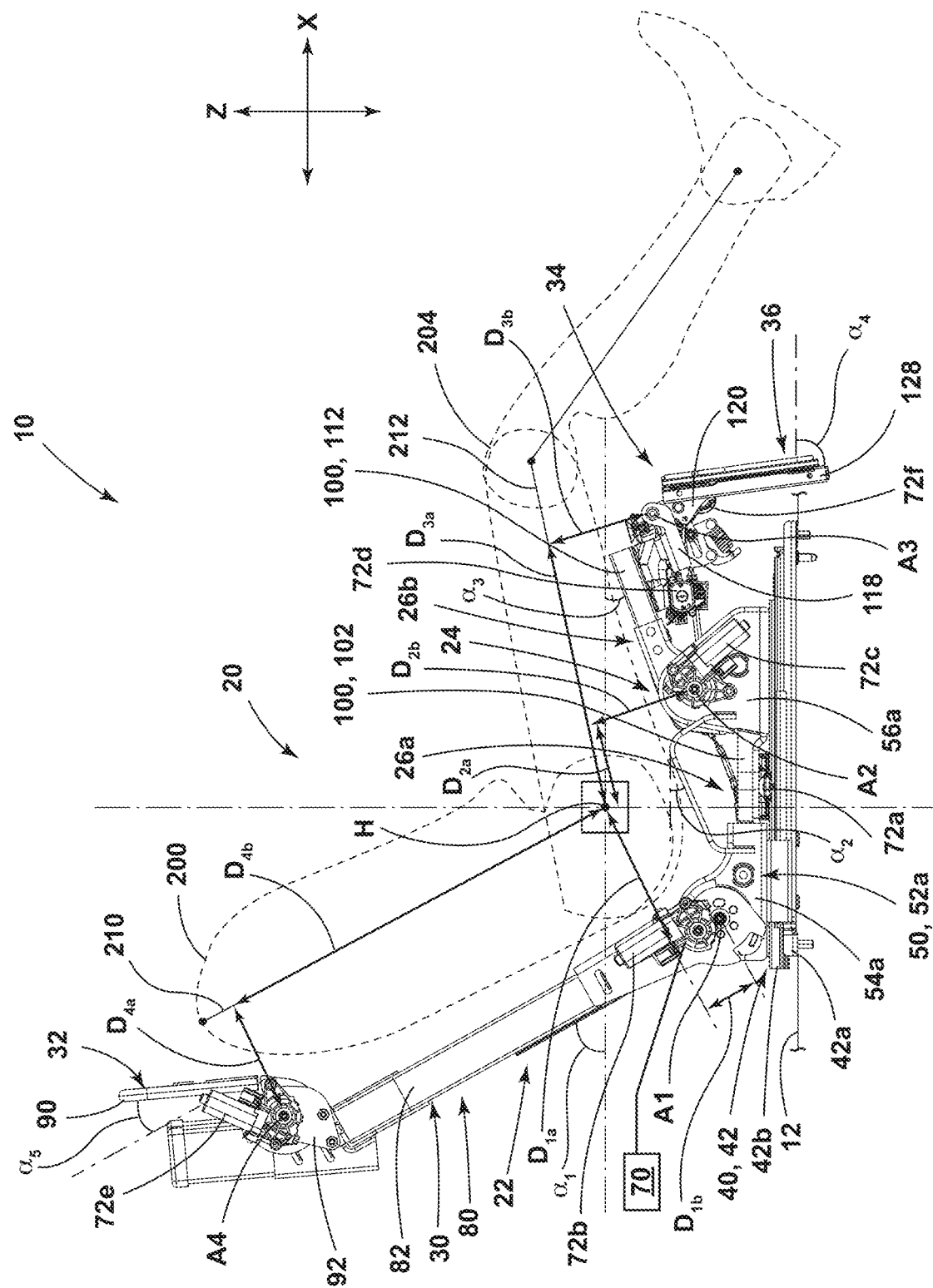
Figure 10:
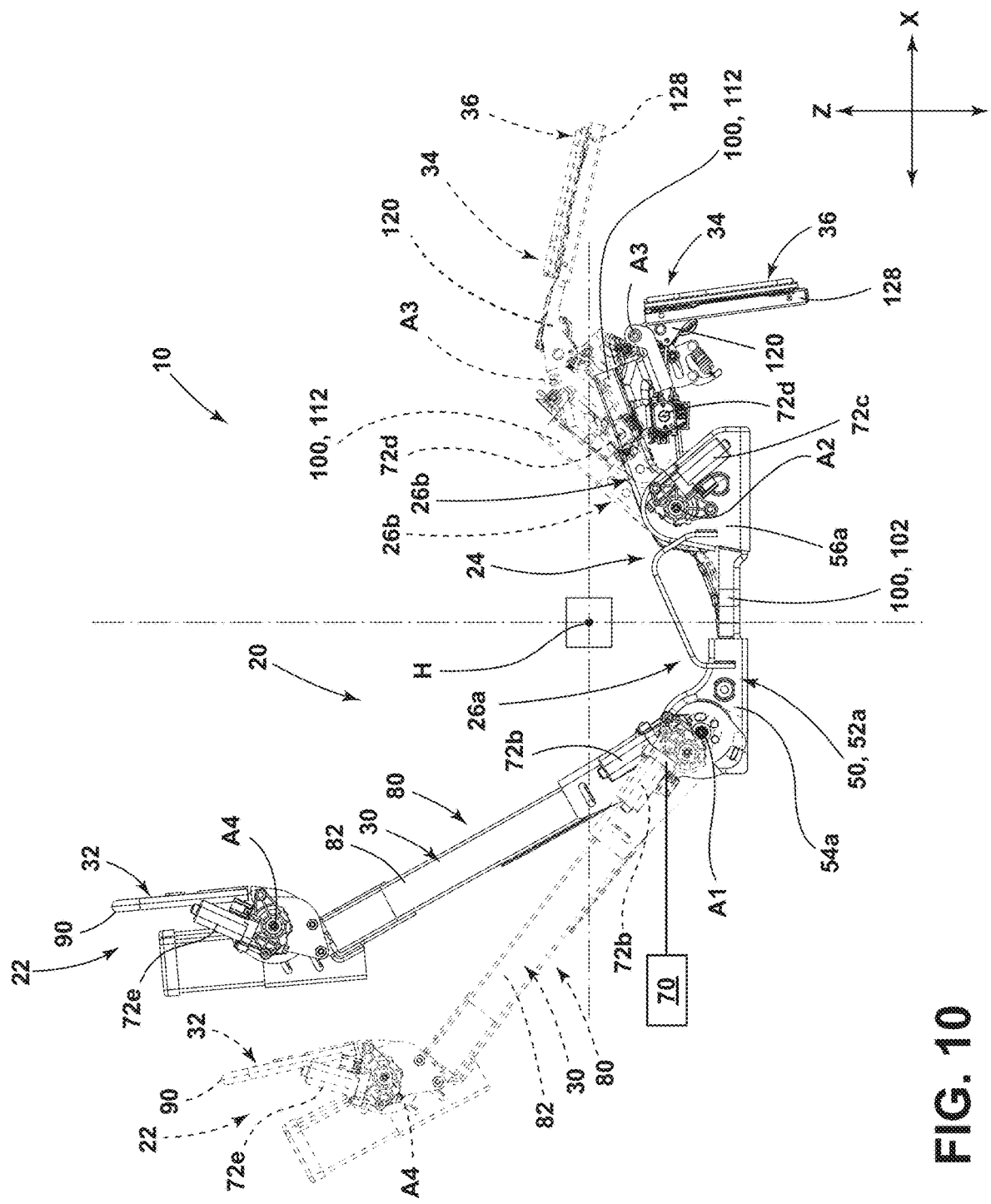
FIGS. 10 and 11 each depict overlayed side views generally illustrating an embodiment of a seat assembly with the seat in the first seat position (solid lines) and with the seat in the second seat position (dotted lines).
Figure 11:
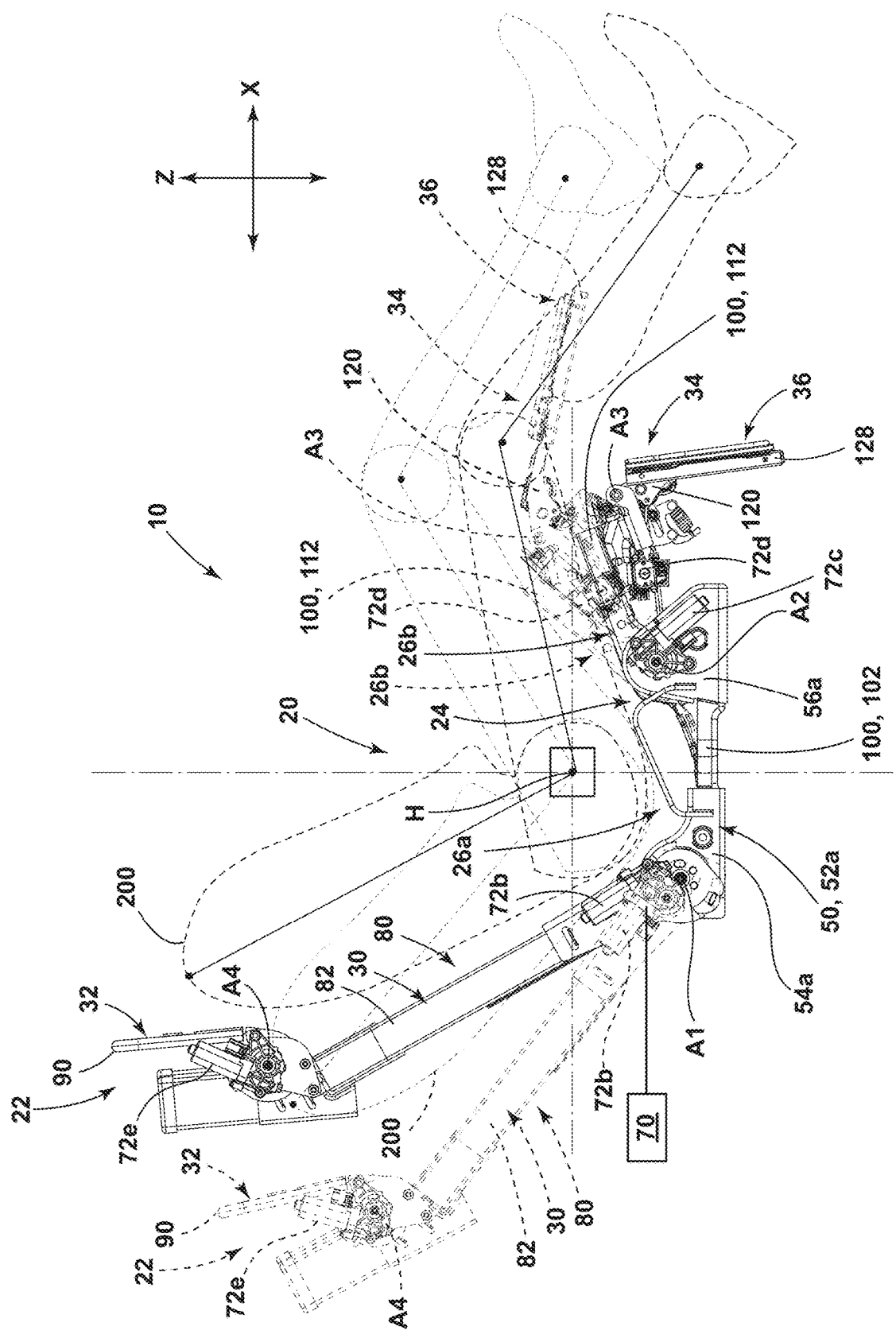

In some embodiments, such as generally depicted in FIGS. 1-12, the seat 22 of the seat assembly 20 includes a seat bottom 24 including a first seat bottom portion 26a that supports the buttocks of an occupant/user 200 and a second seat bottom portion 26b that supports the thighs of the occupant/user 200. FIGS. 7-9 depict the seat assembly 20 when the seat 22 is in the first seat position. FIGS. 1-6 depict the seat assembly 20 when the seat 22 is in the second seat position. FIGS. 10 and 11 depict overlayed images of the seat 22 in the first seat position (solid lines) and the seat 22 in the second seat position (dotted lines).

Figure 13:
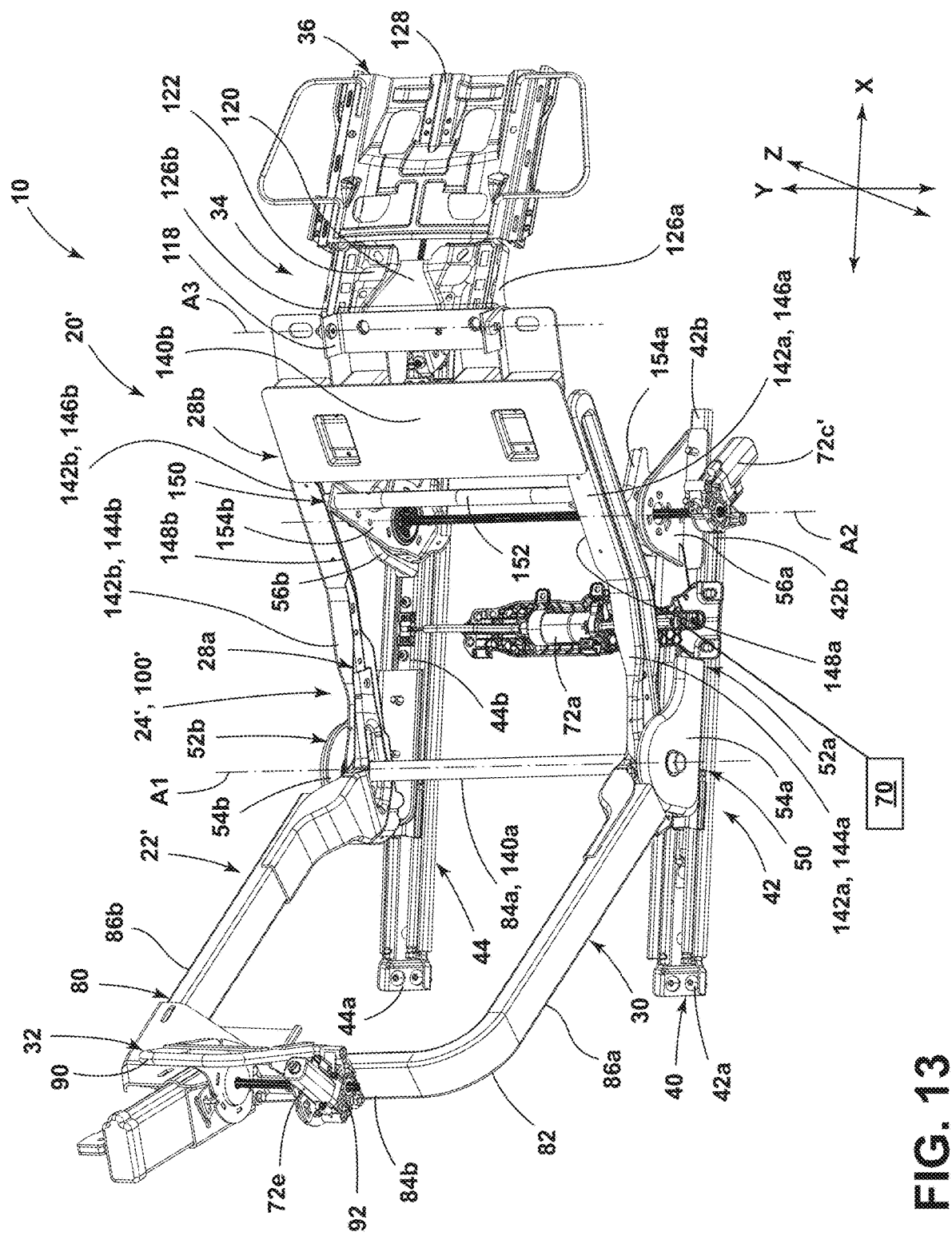
FIGS. 13 and 14 are a perspective view and a side view, respectively, generally illustrating an embodiment of a seat assembly including a seat disposed in a second seat position according to teachings of the present disclosure.
Figure 14:
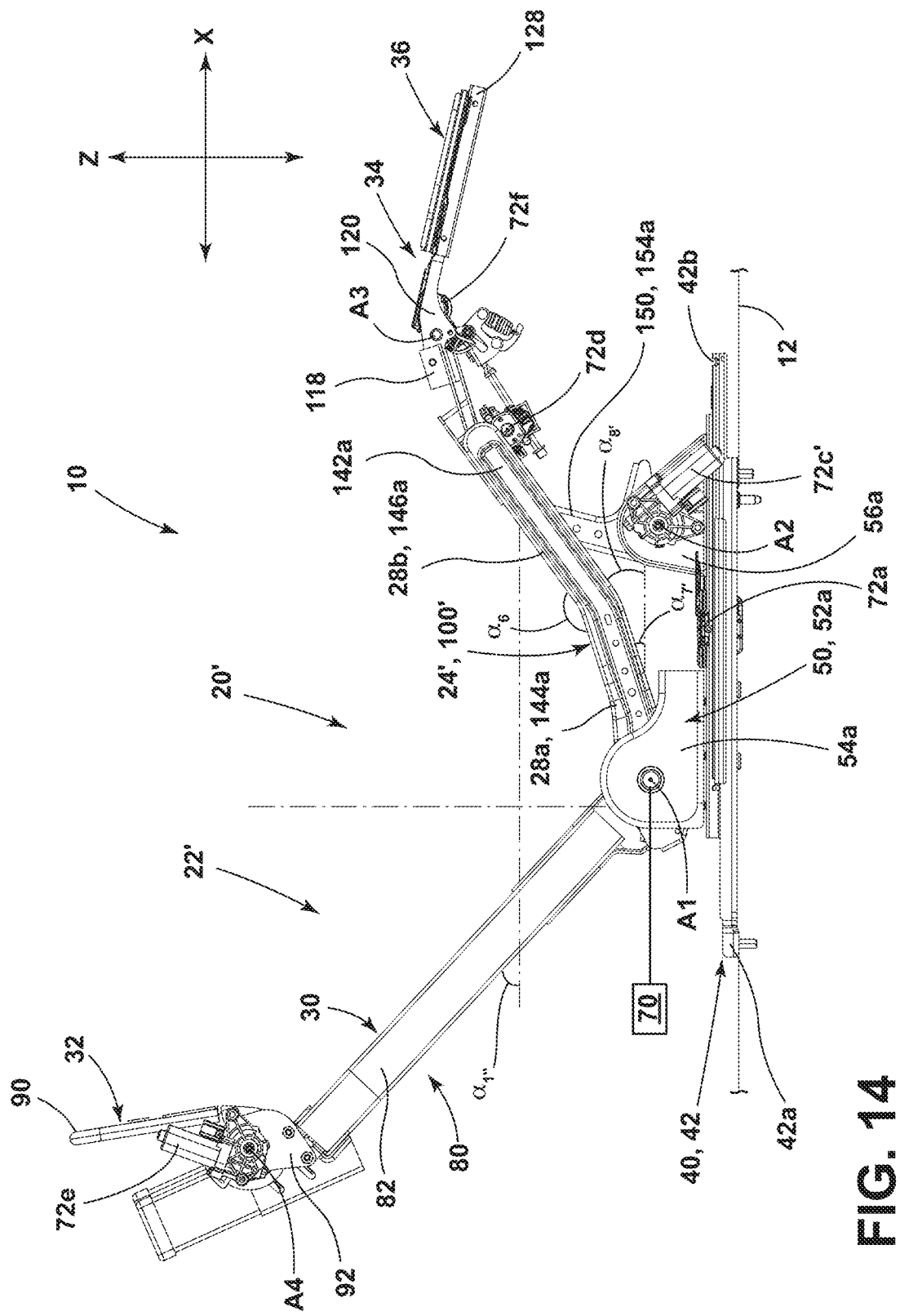
Figure 15:
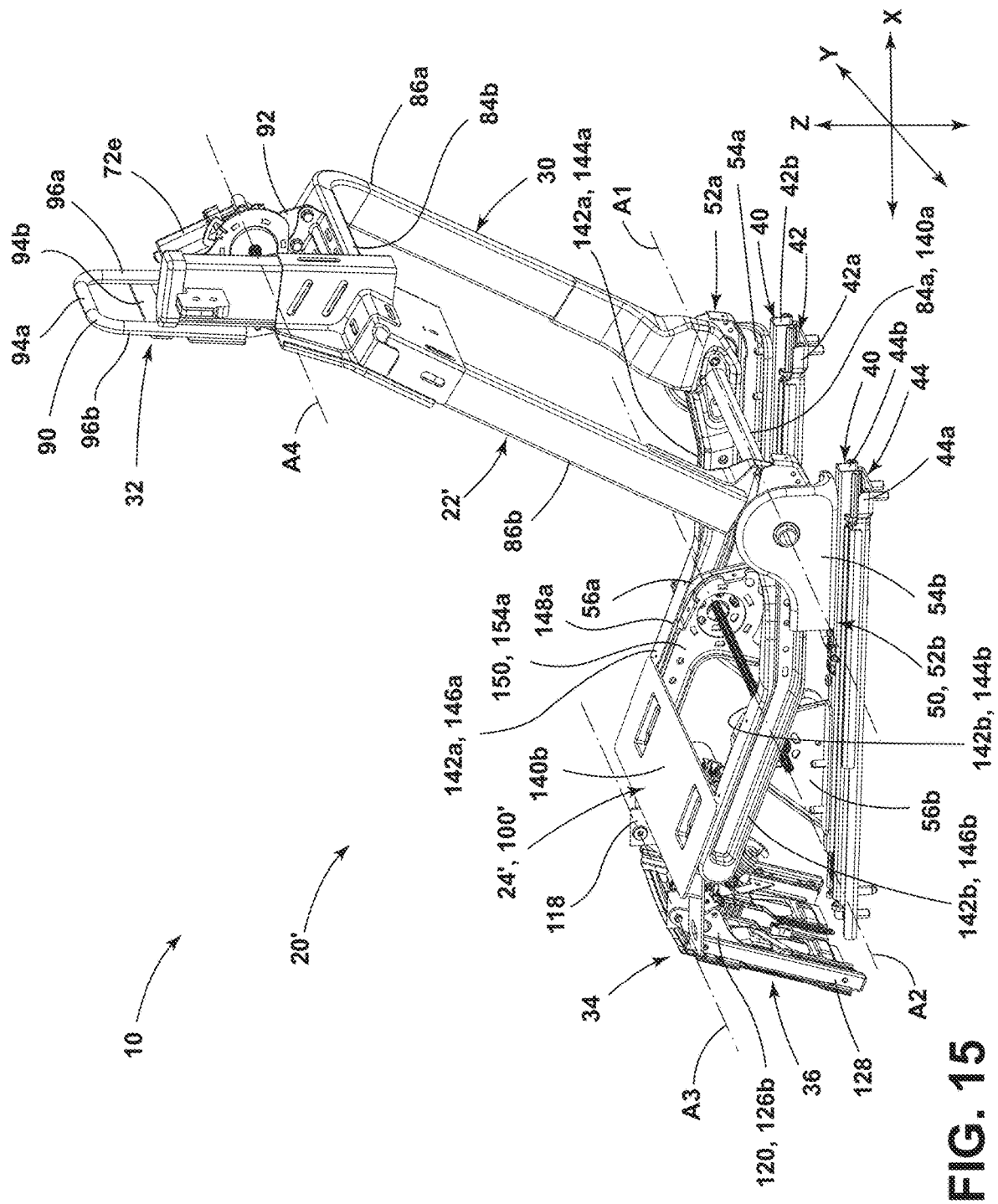
FIGS. 15 and 16 are a perspective view and a side view, respectively, generally illustrating an embodiment of a seat assembly including a seat disposed in a first seat position according to teachings of the present disclosure.
Figure 16:
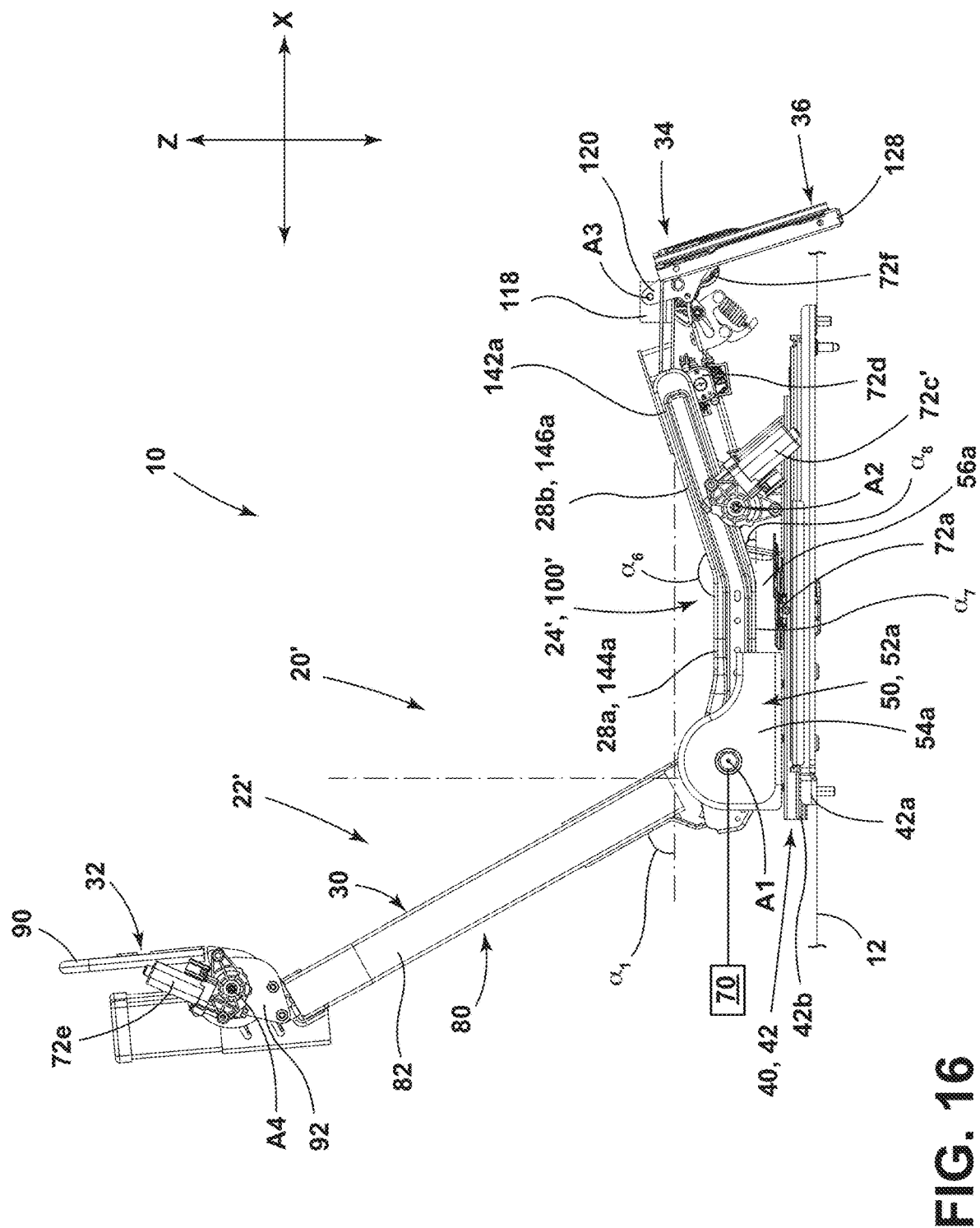
Figure 17:
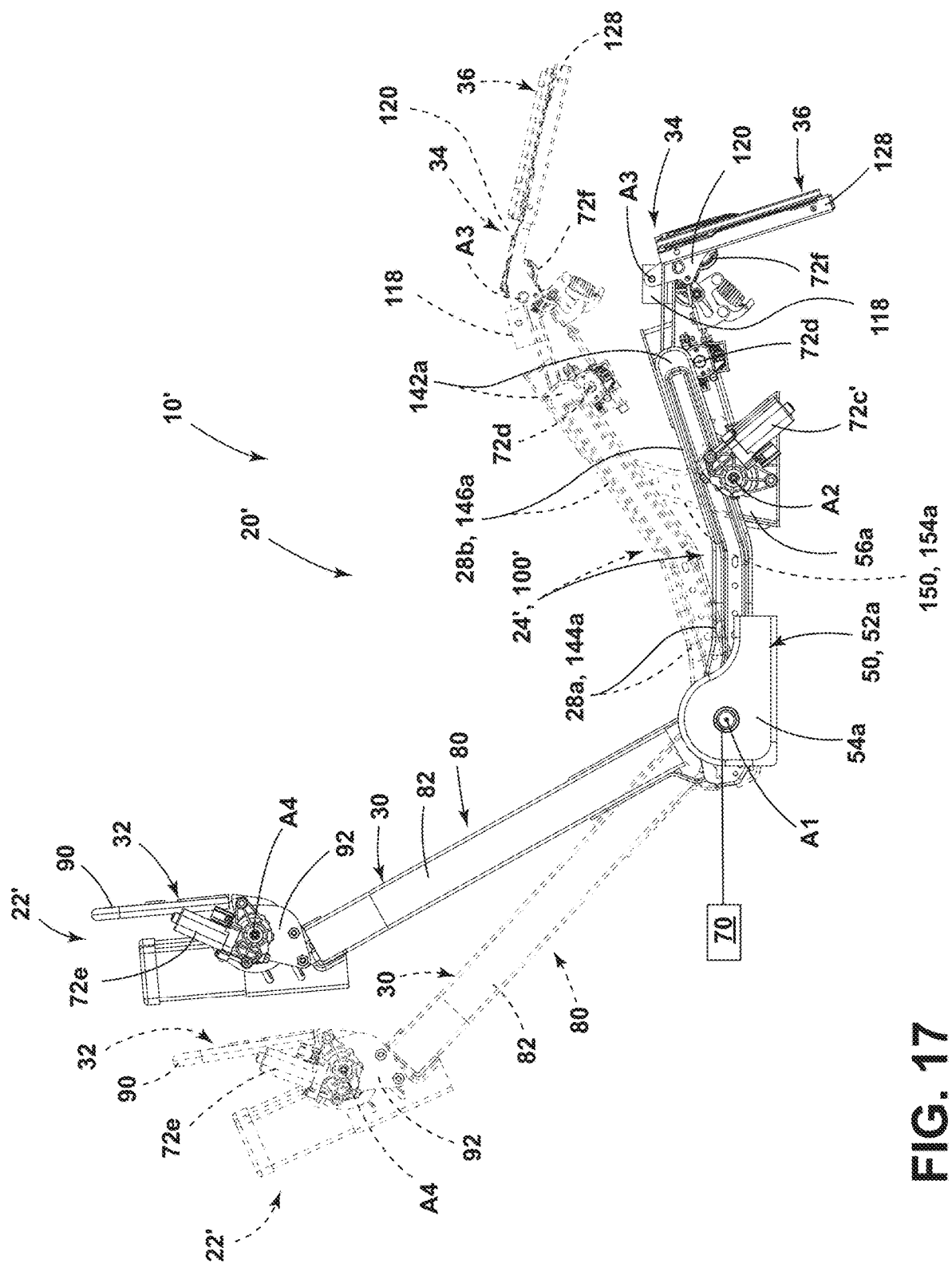
FIG. 17 depicts overlayed side views generally illustrating an embodiment of a seat assembly with the seat in the first seat position (solid lines) and with the seat in the second seat position (dotted lines).
Figure 18:
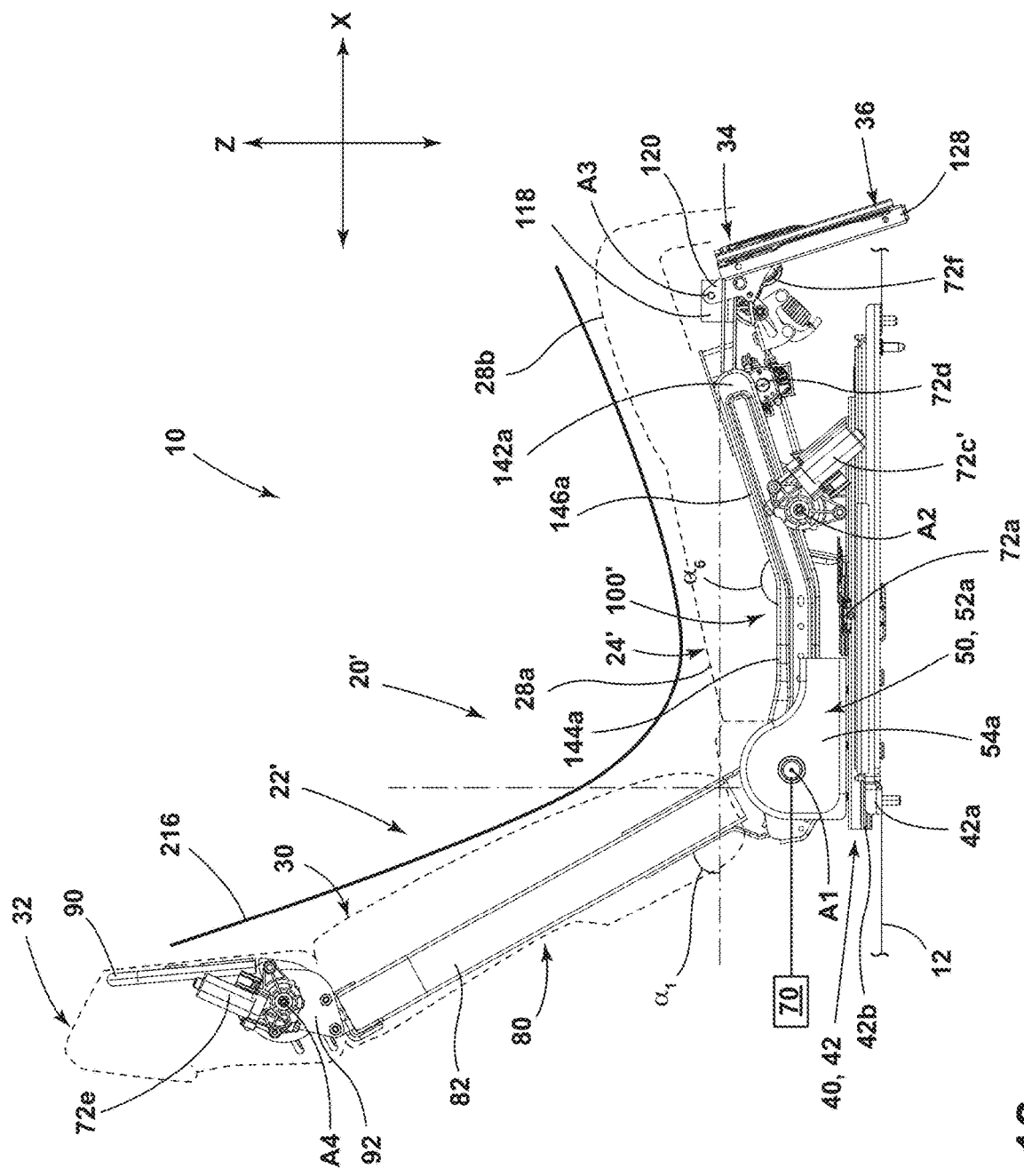
FIGS. 18, 19, and 20 are side views generally illustrating an embodiment of a seat assembly including a seat disposed in a first seat position, a seat disposed in a second seat position, and a seatback disposed at a large recline angle, respectively, according to teachings of the present disclosure.
Figure 19:
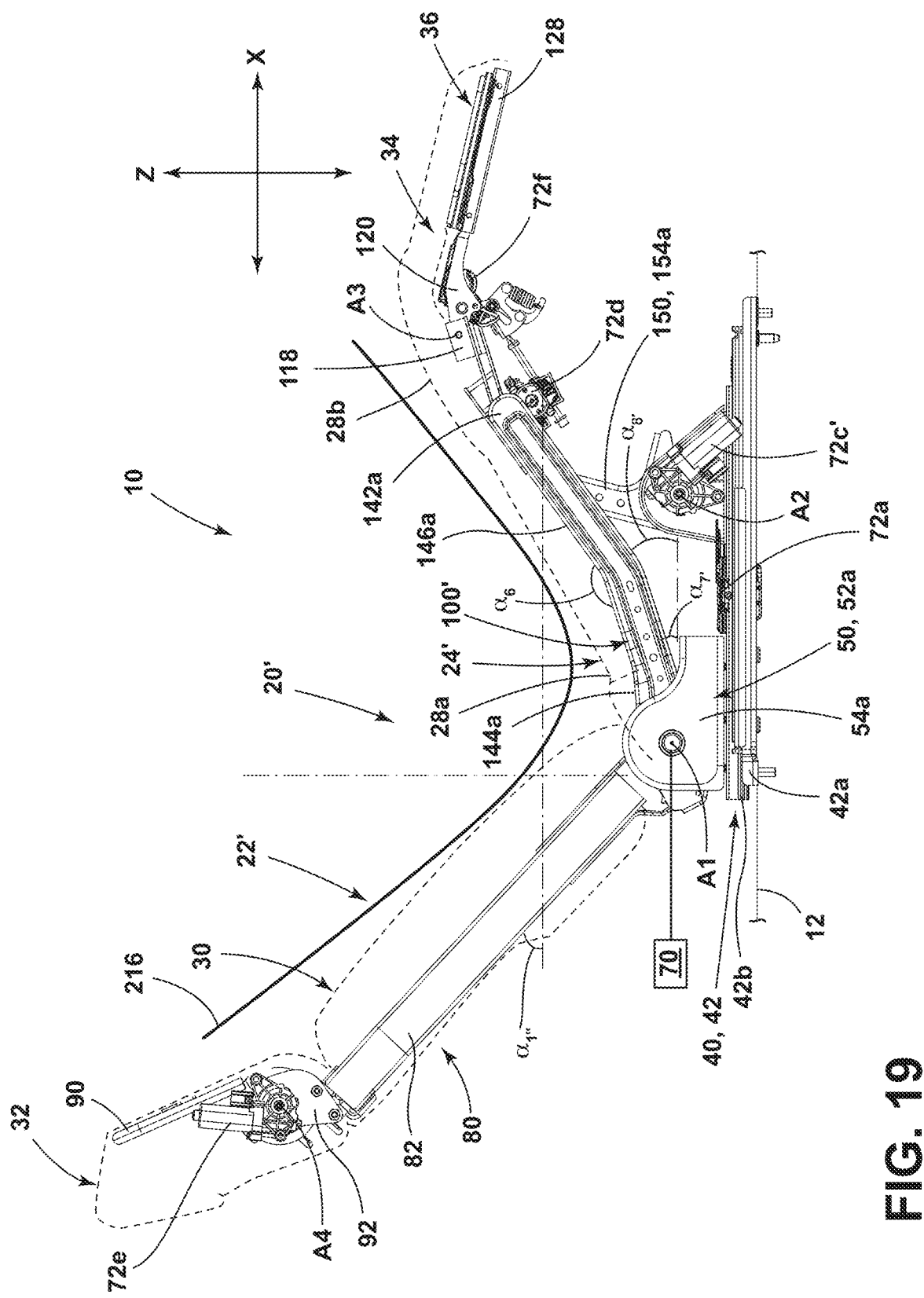

In other embodiments, such as generally depicted in FIGS. 13-20, the seat 22' of the seat assembly 20' includes an adjustment member 150 and a seat bottom 24', which includes a single seat bottom portion having a first angled section 28a for supporting the buttocks of an occupant/user 200 and a second angled section 28b for supporting the thighs of the occupant/user 200. FIGS. 15, 16, and 18 depict the seat assembly 20' when the seat 22' is in the first seat position. FIGS. 13, 14, and 19 depict the seat assembly 20' when the seat 22' is in the second seat position. FIG. 17 depicts overlayed images of the seat 22' in the first seat position (solid lines) and the seat 22' in the second seat position (dotted lines).

Referring to FIGS. 7-11 and 15-18, the first seat position is a so-called 'design position'. The design position corresponds to an occupant/user 200 of average size seated in a predefined occupant position (e.g., at a predefined location with a predefined orientation and posture). The predefined occupant position is generally established when designing the seat assembly 20, 20' and/or the vehicle 10 (e.g., an interior of the vehicle 10, including the safety systems such as airbags and seatbelts, may be designed based on an average adult male or female occupant 200 seated in the predefined occupant position). Optionally, the seat 22, 22' is configured to be in the design position when evaluating whether the seat assembly 20, 20' and/or vehicle 10 complies with one or more regulations and/or standards (e.g., safety standards).

Referring to FIGS. 1-6, 10, 11, 13, 14, 17, and 19, the second seat position is a so-called 'zero-gravity position'. When the seat 22, 22' is in the zero-gravity position, an average-sized occupant/user 200 of the seat assembly 20, 20' is positioned such that the occupant's head 202 and knees 204 are raised slightly above at least a portion of the occupant's heart 218, and the occupant's torso line 210 and thigh line 212 roughly form a 120° angle (e.g., at the occupant's hips). The zero-gravity position is configured to position the occupant/user 200 is in or near a what is considered a natural body position. The zero-gravity position is also configured to reduce and/or minimize stress on the occupant's spine and pelvis, improve blood flow/circulation, and/or reduce occupant fatigue, which may improve occupant comfort.

Referring to FIGS. 1-9, 13-16, and 18-20, the track assembly 40 includes one or more tracks (e.g., a first track 42 and a second track 44). Each track 42, 44 includes a fixed track portion 42a, 44a and a movable track portion 42b, 44b. The fixed track portion 42a, 44a is connected (e.g., fixed) to a floor 12 of the vehicle 10. The movable track portion 42b, 44b is slidably connected to the fixed track portion 42a, 44a. The first track 42, the second track 44 and/or the fixed track portion 42a, 44a and the movable track portion 42b, 44b thereof longitudinally extend generally in an X-direction and substantially parallel to one another (e.g., a longitudinal direction of the track assembly 40 extends generally in the X-direction). The first track 42 and the second track 44 are disposed spaced apart from one another generally in a Y-direction. The seat 22, 22' (e.g., the seat base 50) is removably and/or slidably connected to the movable track portions 42b, 44b of the track assembly 40. The movable track portions 42b, 44b are adjustable (e.g., slidable) along the fixed track portions 42a, 44a via actuation of a motor of the seat adjuster 70 (e.g., the first motor 72a) to adjust the seat 22, 22' along the track assembly 40.

Referring to FIGS. 1-11 and 13-20, the seat base 50 is connected to the movable track portion 42b, 44b to connect the seat 22, 22' with the track assembly 40. The seat base 50 is adjustable (e.g., slidable) along the track assembly 40 via actuation of a motor of the seat adjuster 70 (e.g., the first motor 72a), which adjusts (e.g., slides) the movable track portions 42b, 44b relative to the fixed track portions 42a, 44a to adjust the seat base 50 along the track assembly 40. The seat base 50 includes a first seat base portion 52a and a second seat base portion 52b, which each include a rear base portion 54a, 54b and a front base portion 56a, 56b. The first seat base portion 52a and/or the portions 54a, 56a thereof are connected to the first movable track portion 42b. The second seat base portion 52b and/or the portions 54b, 56b thereof are connected to the second movable track portion 44b. The rear base portion 54a, 54b and the front base portion 56a, 56b of one or more of the seat base portions 52a, 52b are connected to one another via the corresponding movable track portion 42b, 44b and/or the seat frame 80 (e.g., the seat bottom frame 100, a side-member 106a, 106b).

Referring to FIGS. 1-20, the seat frame 80 includes a seatback frame 82, a headrest frame 90, a seat bottom frame 100, 100', a calf rest frame 120, and an extension frame 128. In some embodiments, the seat bottom frame 100 includes a first seat bottom frame portion 102 and a second seat bottom frame portion 112 (see, e.g., FIGS. 1-11). In other embodiments, the seat bottom frame 100' includes a single, angled portion that is adjustable about/around the first pivot axis A1 (see, e.g., FIGS. 13-20). In some embodiments, such as generally depicted in FIGS. 1-12, the seat frame 80 includes the seat base 50 and/or the seat base 50 at least partially defines a portion of the seat frame 80 (e.g., the seatback frame 82 and/or the first seat bottom frame portion 102). In other embodiments, the seat frame 80 is a separate component/element/assembly from the seat base 50 and is connected (e.g., adjustably, pivotably) to the seat base 50 (see, e.g., FIGS. 13-20). The seat frame 80 and/or portions thereof include a plurality of cross members (e.g., cross-members 84a, 84b, 94a, 94b, 104a, 104b, 114a, 114b, 124, 140a, 140b) and side-members (e.g., side-members 86a, 86b, 96a, 96b, 106a, 106b, 116a, 116b, 126a, 126b, 142a, 142b). A cross-member and/or a side-member may include one or more of a variety of configurations, such as a member, a beam, a bar, a rod, and/or a tube.

Referring to FIGS. 1-11 and 13-20, the seatback frame 82 includes a plurality of cross-members (e.g., a first cross-member 84a and a second cross-member 84b) and a plurality of side-members (e.g., a first side-member 86a and a second side-member 86b). The first and second cross-members 84a, 84b extend between and connect the first and second side-members 86a, 86b. The seatback frame 82 is disposed in and/or connected to the seatback 30. The seatback 30 and/or the seatback frame 82 (e.g., the two side-members 86a, 86b) is pivotably connected to the rear base portions 54a, 54b of the seat base 50, the seat bottom 24, 24', and/or the seat bottom frame 100, 100' (e.g., the first seat bottom frame portion 102, the first angled portions 144a, 144b) at or about a first pivot axis A1. The seatback 30 and/or the seatback frame 82 (e.g., the second-cross member 84b) is connected to the headrest 32 and/or the headrest frame 90 at or about a fourth pivot axis A4 (e.g., a headrest pivot axis) via a bracket 92. The first pivot axis A1 and the fourth pivot axis A4 generally extend in the Y-direction (e.g., perpendicular to the longitudinal direction of the track assembly 40, and/or parallel to the second pivot axis A2 and/or the third pivot axis A3).

The seatback 30 and the seatback frame 82 are pivotable about/around the first pivot axis A1 via actuation of a motor of the seat adjuster 70 (e.g., the second motor 72b) to adjust an angle/inclination of the seatback 30 and/or the seatback frame 82 relative to the track assembly 40, the seat bottom 24, 24' (e.g., the first seat bottom portion 26a, the first angled section 28a), and/or the seat bottom frame 100, 100' (e.g., the first seat bottom frame portion 102 and/or the first angled portions 144a, 144b). The seatback 30 and/or the seatback frame 82 is adjustable about/around the first pivot axis A1 to a first seatback position (see, e.g., FIGS. 7-11 and 15-18) and a second seatback position (see, e.g., FIGS. 1-6, 10, 11, 13, 14, 17, and 19). Adjusting the seatback 30 to the second seatback position, such as from the first seatback position, adjusts the user's head 202 downward toward the track assembly 40 (e.g., to a position slightly above a level of the heart 218 of the user 200). The seatback 30 and/or the seatback frame 82 is disposed in the first seatback position when the seat 22, 22' is in the first seat position (e.g., the design position) and is disposed in the second seatback position when the seat 22, 22' is in the second seat position (e.g., the zero-gravity position).

Referring to FIGS. 1-20, the headrest frame 90 includes a plurality of cross-members (e.g., a first cross-member 94a and a second cross-member 94b) and a plurality of side-members (e.g., a first side-member 96a and a second side-member 96b). The first and second cross-members 94a, 94b extend between and connect the first and second side-members 96a, 96b. The headrest frame 90 is disposed in and/or connected to the headrest 32. The headrest 32 and/or the headrest frame 90 (e.g., the side-members 96a, 96b) is pivotably connected to the seatback 30 and/or the seatback frame 82 (e.g., the second cross-member 84b) opposite the seat base 50, the seat bottom 24, 24', and/or the seat bottom frame 100, 100' at or about the fourth pivot axis A4 via the bracket 92. The headrest 32 and/or the headrest frame 90 are pivotable about the fourth pivot axis A4 via actuation of a motor of the seat adjuster 70 (e.g., the fifth motor 72e) to adjust an angle/inclination of the headrest 32 and/or the headrest frame 90 relative to the seatback 30, the seatback frame 82, and/or the track assembly 40. The headrest 32 and/or the headrest frame 90 is adjustable about/around the fourth pivot axis A4 to a first headrest position (see, e.g., FIGS. 7-12 and 15-18) and a second headrest position (see, e.g., FIGS. 1-6, 10-14, 17, and 19).

Figure 12:
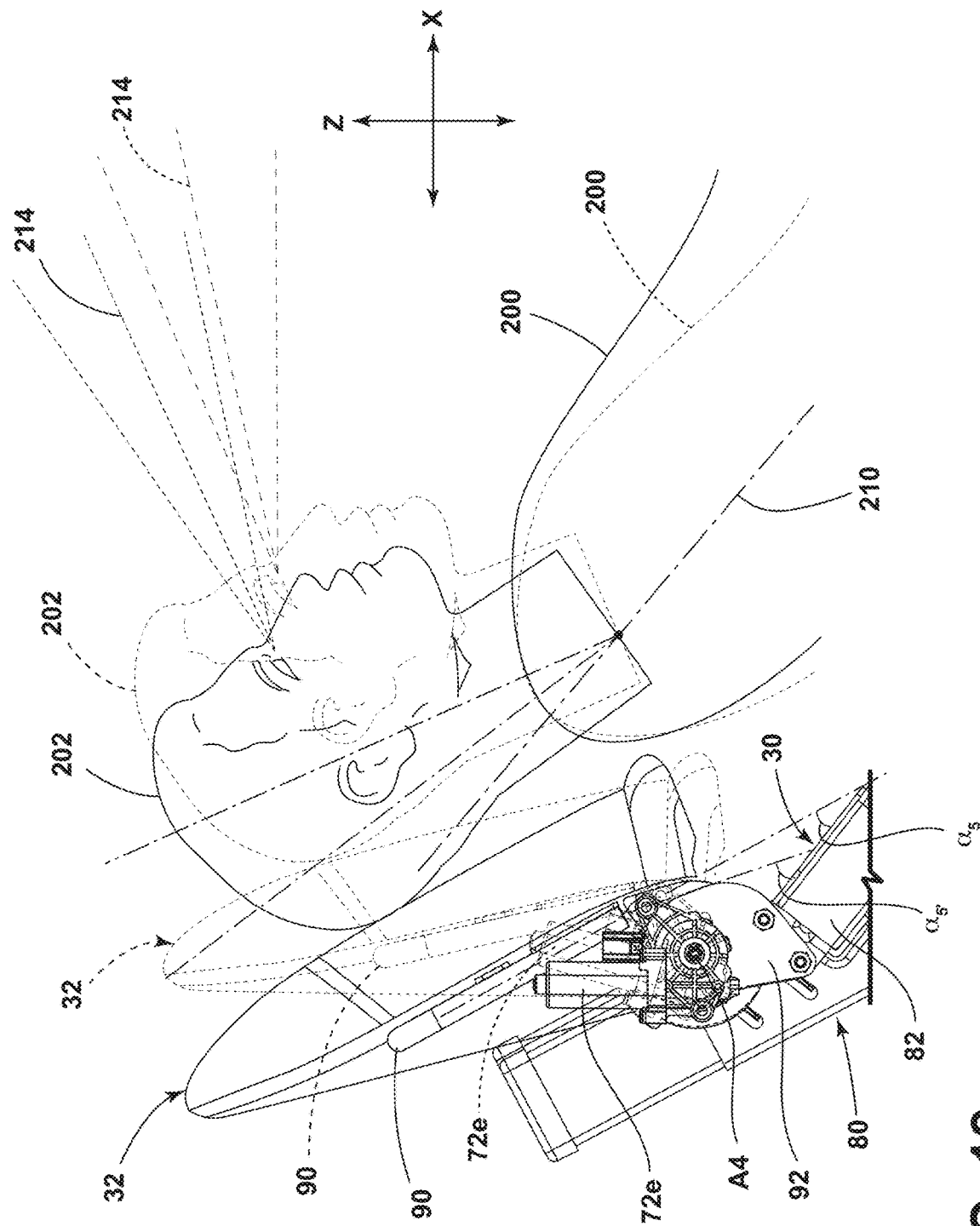
FIG. 12 depicts overlayed side views generally illustrating an embodiment of a seat assembly with the headrest in the first headrest position (solid lines) and with the headrest in the second headrest position (dotted lines).

FIG. 12 depicts overlayed images of the headrest 32 in the first headrest position (solid lines) and the headrest 32 in the second headrest position (dotted lines) when the seatback 30 is in the second seatback position. Adjusting the headrest 32 to the second headrest position, such as from the first headrest position, adjusts a user's head 202 to a more forward-facing viewing position to reduce an angle defined between the user's eyeline 214 and the X-direction and/or the longitudinal direction of the track assembly 40. This may in turn may position the user's head 202 to view the windshield, a screen, and/or another component more easily, which may improve the user's comfort and experience. The headrest 32 and/or the headrest frame 90 is disposed in the first headrest position when the seat 22, 22' is in the first seat position (e.g., the design position) and is disposed in the second headrest position when the seat 22, 22' is in the second seat position (e.g., the zero-gravity position).

Referring to FIGS. 1-11, the seat bottom frame 100 includes a first seat bottom frame portion 102 and a second seat bottom frame portion 112. The first and second seat bottom frame portions 102, 112 each include a plurality of cross-members (e.g., a first cross-member 104a, 114a and a second cross-member 104b, 114b) and a plurality of side-members (e.g., a first side-member 106a, 116a and a second side-member 106b, 116b).

The first seat bottom frame portion 102 is connected to and/or at least partially defined by the rear base portions 54a, 54b and/or the front base portions 56a, 56b. The first cross-member 104a of the first seat bottom frame portion 102 extends between and connects the rear base portions 54a, 54b and the side-members 106a, 106b to one another. The second cross-member 104b of the first seat bottom frame portion 102 extends between and connects the front base portions 56a, 56b and the side-members 106a, 106b to one another. The first seat bottom frame portion 102 is disposed in and/or connected to the first seat bottom portion 26a. The first seat bottom portion 26a and/or the first seat bottom frame portion 102 is pivotably connected to the seatback 30 and/or the seatback frame 82 at or about the first pivot axis A1. The first seat bottom portion 26a and/or the first seat bottom frame portion 102 is pivotably connected to the second seat bottom portion 26b and/or the second seat bottom frame portion 112 at or about the second pivot axis A2. The first seat bottom portion 26a and/or the first seat bottom frame portion 102 is, optionally, fixed to the seat base 50 (e.g., the rear base portions 54a, 54b and the front base portions 56a, 56b) and/or the movable track portions 42b, 44b such that, for example, the position and/or orientation of the first seat bottom portion 26a and/or the first seat bottom frame portion 102 relative to the seat base 50, the first pivot axis A1, the second pivot axis A2, and the movable track portions 42b, 44b does not change (e.g., the first seat bottom portion 26a and the first seat bottom frame portion 102 are not pivotable about/around the first pivot axis A1 or the second pivot axis A2). The first seat bottom portion 26a (e.g., a seating surface thereof) is, optionally, disposed at an angle $\alpha_2$ of 20°-30° (e.g., 24°) relative to the longitudinal direction of the track assembly 40.

Referring to FIGS. 1-9, 13-16, and 18-20, the seat base 50, the first seat bottom portion 26a, and/or the first seat bottom frame portion 102 is adjustable along the track assembly 40 generally in the longitudinal direction of the track assembly 40 (e.g., generally in the X-direction) to a rearward position (see, e.g., FIGS. 7-9, 15, 16, and 18) and a forward position (see, e.g., FIGS. 1-6, 13, 14, and 19) via adjusting/moving the seat base 50 and the movable track portions 42b, 44b along the fixed track portions 42a, 44a with the seat adjuster 70 and the first motor 72a. The seat base 50, the first seat bottom portion 26a, and/or the first seat bottom frame portion 102 is disposed in the rearward position when the seat 22, 22' is in the first seat position (e.g., the design position) and is disposed in the forward position when the seat 22, 22' is in the second seat position (e.g., the zero-gravity position). Positioning the seat base 50 and/or the first seat bottom portion 26a in the forward position when in the seat 22, 22' is in the second seat position places the seat 22, 22' in a more centralized position relative to the track assembly 40, which may reduce and/or limit intrusion of the seatback 30 on an occupant/user of a rearwardly adjacent seat (e.g., a seat in a rear row of seats of a vehicle) when the seat 22, 22' is in the second seat position.

Referring to FIGS. 1-11, the first and second cross-members 114a, 114b of the second seat bottom frame portion 112 extend between and connect the first and second side-members 116a, 116b. The side-members 116a, 116b of the second seat bottom frame portion 112 generally extend obliquely to side-members 106a, 106b of the first seat bottom frame portion 102 and/or perpendicularly or obliquely to the cross-members 114a, 114b. The second seat bottom frame portion 112 is disposed in and/or connected to the second seat bottom portion 26b. The second seat bottom portion 26b and/or the second seat bottom frame portion 112 (e.g., the side-members 116a, 116b) is pivotably connected to the first seat bottom portion 26a, the first seat bottom frame portion 102, and/or the front base portions 56a, 56b at or about a second pivot axis A2. The second seat bottom portion 26b and/or the second seat bottom frame portion 112 is pivotably connected to the calf rest 34 and/or the calf rest frame 120 at or about a third pivot axis A3 (e.g., a calf rest pivot axis) via a bracket 118. The second pivot axis A2 and the third pivot axis A3 generally extend in the Y-direction (e.g., perpendicular to the longitudinal direction of the track assembly 40, and/or parallel to the first pivot axis A1 and/or the fourth pivot axis A4).

The second seat bottom portion 26b and/or the second seat bottom frame portion 112 are pivotable about/around the second pivot axis A2 via actuation of a motor of the seat adjuster 70 (e.g., the third motor 72c) to adjust an angle/inclination of the second seat bottom portion 26b and/or the second seat bottom frame portion 112 relative to the track assembly 40, the first seat bottom portion 26a, and/or the first seat bottom frame portion 102. The second seat bottom portion 26b and/or the second seat bottom frame portion 112 is adjustable about/around the second pivot axis A2 to a lowered/default position (see, e.g., FIGS. 7-11) and a raised/elevated position (see, e.g., FIGS. 1-6, 10, and 11). Adjusting the second seat bottom portion 26b to the raised position, such as from the lowered position, adjusts the user's knees 204 upward away from the track assembly 40 (e.g., to a position closer to, at, and/or slightly above the level of at least a portion the heart 218 of the user 200). The second seat bottom portion 26b and/or the second seat bottom frame portion 112 is disposed in the lowered position when the seat 22 is in the first seat position (e.g., the design position) and is disposed in the raised position when the seat 22 is in the second seat position (e.g., the zero-gravity position). In some examples, the second seat bottom portion 26b (e.g., a seating surface thereof) is disposed substantially parallel to the first seat bottom portion 26a (e.g., a seating surface thereof) when the second seat bottom portion 26b is in the lowered position.

Referring to FIGS. 1-11 and 13-20, the calf rest frame 120 includes a support plate 122, a cross-member 124, and a plurality of side-members (e.g., a first side-member 126a and a second side-member 126b). The support plate 122 is connected to and supported by the side-members 126a, 126b and/or the cross-member 124. The cross-member 124 extends between and connects the first and second side-members 126a, 126b. The calf rest frame 120 is disposed in and/or connected to the calf rest 34. The calf rest 34 and/or the calf rest frame 120 is pivotably connected to the seat bottom 24, 24' (e.g., the second seat bottom portion 26b, the second angled section 28b) and/or the seat bottom frame 100, 100' (e.g., the second seat bottom frame portion 112, the second angled portions 146a, 146b and/or the cross-member 140b) at or about the third pivot axis A3 (e.g., the calf rest pivot axis).

The calf rest 34 and/or the calf rest frame 120 are pivotable about the third pivot axis A3 via actuation of a motor of the seat adjuster 70 (e.g., the fourth motor 72d) to adjust an angle/inclination of the calf rest 34 and/or the calf rest frame 120 relative to the seat bottom 24, 24' (e.g., the second seat bottom portion 26b, the second angled section 28b), the seat bottom frame 100, 100' (e.g., the second seat bottom frame portion 112, the second angled portions 146a, 146b), and/or the track assembly 40. The calf rest 34 and/or the calf rest frame 120 is adjustable about/around the third pivot axis A3 to a first calf rest position (see, e.g., FIGS. 7-11 and 15-18) and a second calf rest position (see, e.g., FIGS. 1-6, 10, 11, 13, 14, 17, and 19). The calf rest 34 and/or the calf rest frame 120 is disposed in the first calf rest position when the seat 22, 22' is in the first seat position (e.g., the design position) and is disposed in the second calf rest position when the seat 22, 22' is in the second seat position (e.g., the zero-gravity position).

Referring to FIGS. 1-11 and 13-20, the extension frame 128 is disposed in and/or connected to the calf rest extension 36. The calf rest extension 36 and/or the extension frame 128 is slidably connected to the calf rest 34 and/or the calf rest frame 120. The calf rest extension 36 and/or the extension frame 128 is adjustable relative to the calf rest 34, the calf rest frame 120, and/or the seat bottom 24, 24' via the seat adjuster 70 and/or a motor thereof (e.g., the sixth motor 72f) to a retracted position (see, e.g., FIGS. 7-11 and 15-18) and to an extended position (see, e.g., FIGS. 1-6, 10, 11, 13, 14, 17, and 19). The calf rest extension 36 and/or the extension frame 128 is disposed in the retracted position when the seat 22, 22' is in the first seat position (e.g., the design position) and is disposed in the extended position when the seat 22, 22' is in the second seat position (e.g., the zero-gravity position).

Referring to FIGS. 1-11 and 13-20, the seat adjuster 70 is connected to the seat 22, 22' and/or the track assembly 40. The seat adjuster 70 includes a controller and/or a plurality of motors (e.g., six motors 72a-72f), and is configured to actuate (e.g., individually and/or simultaneously) the plurality of motors 72a-72f. One or more of the plurality of motors 72a-72f includes an electric motor.

A first motor 72a is operatively connected to the track assembly 40 and adjusts a position of the movable track portions 42b, 44b and the seat 22, 22' connected thereto relative to the fixed track portions 42a, 44a (e.g., to the rearward position and/or to the forward position) when actuated by the seat adjuster 70.

A second motor 72b is operatively connected to the seatback frame 82 and at least one of the rear base portions 54a, 54b. The second motor 72b adjusts a position of the seatback 30 and/or the seatback frame 82 relative to the track assembly 40, the seat bottom 24, 24' (e.g., the first seat bottom portion 26a and/or the first angled section 28a), and/or the seat bottom frame 100, 100' (e.g., the first seat bottom frame portion 102 and/or the first angled portions 144a, 144b) when actuated by the seat adjuster 70 to, for example, adjust the seatback 30 to the first seatback position and/or to the second seatback position.

A third motor 72c is operatively connected to the second seat bottom frame portion 112 and at least one of the front base portions 56a, 56b. The third motor 72c adjusts a position of the second seat bottom portion 26b and/or the second seat bottom frame portion 112 relative to the track assembly 40, the first seat bottom portion 26a, and/or the first seat bottom frame portion 102 (e.g., to the lowered position and/or to the raised position) when actuated by the seat adjuster 70.

A fourth motor 72d is operatively connected to the seat bottom frame 100, 100' and the calf rest frame 120. The fourth motor 72d is configured to adjust a position of the calf rest 34 and/or the calf rest frame 120 relative to the track assembly 40, the seat bottom 24, 24' (e.g., the second seat bottom portion 26b and/or the second angled section 28b), and/or the seat bottom frame 100, 100' (e.g., the second seat bottom frame portion 112 and/or the second angled portions 146a, 146b) when actuated by the seat adjuster 70 to, for example, adjust the calf rest 34 and/or the calf rest frame 120 to the first calf rest position and/or to the second calf rest position.

A fifth motor 72e is operatively connected to the seatback frame 82 and the headrest frame 90. The fifth motor 72e adjusts a position of the headrest 32 and/or the headrest frame 90 relative to the seatback 30 and/or the seatback frame 82 (e.g., to the first headrest position and/or to the second headrest position) when actuated by the seat adjuster 70.

A sixth motor 72f is operatively connected to the support plate 122 of the calf rest frame 120 and the extension frame 128. The sixth motor 72f adjusts a position of the calf rest extension 36 and/or the extension frame 128 relative to the third pivot axis A3 and/or one or more other portions of the calf rest 34 (e.g., to the extended position and/or to the retracted position) when actuated by the seat adjuster 70.

In some embodiments, the seat adjuster 70 adjusts the seat 22 to one or more seat positions, including the first seat position (e.g., a design position) and the second seat position (e.g., a zero-gravity position). When adjusting the seat 22 from the first seat position to the second seat position or vice versa, the seat adjuster 70: adjusts (e.g., reclines) the seatback 30 and/or the seatback frame 82 about/around the first pivot axis A1 20°-30° (e.g., 23°-27°; 25°); adjusts the second seat bottom portion 26b and/or the second seat bottom frame portion 112 about the second pivot axis A2 10°-20° (e.g., 13°-17°; 15°); adjusts the calf rest 34 and/or the calf rest frame 120 about the third pivot axis A3 20°-30° (e.g., 23°-27°; 25°); and adjusts the headrest 32 and/or the headrest frame 90 about the fourth pivot axis A4 10°-20° (e.g., 13°-17°; 15°). Optionally, the seat adjuster 70 simultaneously adjusts the moveable track portions 42b, 44b, the seat base 50, and the first seat bottom portion 26a along the track assembly 40 in the longitudinal direction (e.g., via actuating the first motor 72a), the seatback 30 about the first pivot axis A1 (e.g., via actuating the second motor 72b), the second seat bottom portion 26b about the second pivot axis A2 (e.g., via actuating the third motor 72c), the calf rest 34 about the third pivot axis A3 (e.g., via actuating the fourth motor 72d), and the headrest 32 about the fourth pivot axis A4 (e.g., via actuating the fifth motor 72e) to adjust the seat 22 to the first seat position and/or to the second seat position. In some embodiments, the seat adjuster 70 simultaneously adjusts the calf rest extension 36 to the retracted position and to the extended position (e.g., via actuating the sixth motor 72f) in conjunction with the other portions of the seat 22 to adjust the seat 22 to the first seat position and to the second seat position, respectively.

Referring to FIGS. 10 and 11, the seat is configured such that a hip point H of an occupant/user 200 is located in substantially the same position relative to the seat base 50, the first seat bottom portion 26a, the first seat bottom frame portion 102, the first pivot axis A1, and/or the second pivot axis A2 when the seat 22 is in the first seat position (e.g., the design position), when the seat 22 is in the second seat position (e.g., the zero-gravity position), and/or when the seat 22 is in one or more other positions (e.g., a position between the first seat position and the second seat position). As such, the position of the user's hip point H relative to one or more safety devices (e.g., airbag(s), seat belt attachment locations, others), which are generally optimized for the first seat position, is maintained when in the second seating position. This may in turn increase the effectiveness of one or more safety devices and/or reduce the injury risk to the occupant/user 200 in the event of a collision when the seat 22 is in the second seat position.

Referring to FIGS. 1-11, one or more portions of the seat assembly 20 are disposed as described below when the seat 22 is in the first seat position (e.g., the design position), the second seat position (e.g., the zero-gravity position), and one or more other positions (e.g., a position between the first seat position and the second seat position). In some embodiments, the first pivot axis A1 is disposed a distance $D_{1d}$ of 175 mm to 225 mm (e.g., 200 mm to 204 mm; 202 mm) from the hip point H, a distance $D_{1x}$ of 115 mm to 165 mm (e.g., 137 mm to 141 mm; 139 mm) behind the hip point H (e.g., in the X-direction), and a distance $D_{1z}$ of 120 mm to 170 mm (e.g., 144 mm to 148 mm; 146 mm) below the hip point H (e.g., in the Z-direction). In some embodiments, the second pivot axis A2 is disposed a distance $D_{2d}$ of 165 mm to 215 mm (e.g., 190 mm to 194 mm; 192 mm) from the hip point H, a distance $D_{2x}$ of 130 mm to 180 mm (e.g., 152 mm to 156 mm; 154 mm) in front of the hip point H (e.g., in the X-direction), and a distance $D_{2z}$ of 90 mm to 140 mm (e.g., 112 mm to 116 mm; 114 mm) below the hip point H (e.g., in the Z-direction). As such, the first pivot axis A1 is disposed farther from the hip point H than the second pivot axis A2 when the seat 22 is in the first seat position and when the seat 22 is in the second seat position. Additionally, the first pivot axis A1 is disposed farther below the hip point H than the second pivot axis A2 when the seat 22 is in the first seat position and when the seat 22 is in the second seat position.

Referring to FIG. 8, portions of the seat assembly 20 are disposed as described below when the seat 22 is in the first seat position (e.g., the design position). The seat base 50 and the first seat bottom portion 26a are disposed in the rearward position, the second seat bottom portion 26b is disposed in the lowered position, the seatback 30 is disposed in the first seatback position, the calf rest 34 is disposed in the first calf rest position, the headrest 32 is disposed in the first headrest position, and the calf rest extension 36 is in the retracted position. The seatback 30 and/or the seatback frame 82 may be disposed at an angle $\alpha_1$ of 59°-63° (e.g., 61°) relative to the longitudinal direction of the track assembly 40. The first seat bottom portion 26a (e.g., a seating surface thereof) may be disposed at an angle $\alpha_2$ of 22°-26° (e.g., 24°) relative to the longitudinal direction of the track assembly 40. The second seat bottom portion 26b and/or the second seat bottom frame portion 112 may be disposed at an angle $\alpha_3$ of 11°-15° (e.g., 13°) relative to the longitudinal direction of the track assembly 40. The calf rest 34 and/or the calf rest frame 120 may be disposed at an angle $\alpha_4$ of 58°-62° (e.g., 60°) relative to the longitudinal direction of the track assembly 40. The headrest 32 and/or the headrest frame 90 may be disposed at an angle $\alpha_5$ of 22°-26° (e.g., 24°) relative to the seatback 30 and/or the seatback frame 82. In some embodiments, the third pivot axis A3 is disposed a distance $D_{3d}$ of 360 mm to 410 mm (e.g., 381 mm to 385 mm; 383 mm) from the hip point H, a distance $D_{3x}$ of 355 mm to 405 mm (e.g., 376 mm to 380 mm; 378 mm) in front of the hip point H (e.g., in the X-direction), and/or a distance $D_{3z}$ of 35 mm to 85 mm (e.g., 58 mm to 62 mm; 60 mm) below the hip point H (e.g., in the Z-direction). In some embodiments, the fourth pivot axis A4 is disposed a distance $D_{4d}$ of 540 mm to 590 mm (e.g., 565 mm to 569 mm; 567 mm) from the hip point H, a distance $D_{4x}$ of 365 mm to 415 mm (e.g., 389 mm to 393 mm; 391 mm) behind the hip point H (e.g., in the X-direction), and/or a distance $D_{4z}$ of 385 mm to 435 mm (e.g., 408 mm to 412 mm; 410 mm) above the hip point H (e.g., in the Z-direction).

The positions of the axes A1, A2, A3, A4 when the seat 22 is in the first seat position can also be expressed by their respective distances to the hip point H in directions defined relative to one or more portions of the occupant/user 200 as generally illustrated in FIG. 9. The first pivot axis A1 is disposed a distance $D_{1a}$ of 180 mm to 200 mm (e.g., 188 mm to 192 mm; 190 mm) from the hip point H in a direction perpendicular to the user's torso line 210 and a distance Dib of 57 mm to 77 mm (e.g., 65 mm to 69 mm; 67 mm) from the hip point H in a direction parallel to the user's torso line 210. The second pivot axis A2 is disposed a distance $D_{2a}$ of 116 mm to 136 mm (e.g., 124 mm to 128 mm; 126 mm) from the hip point H in a direction parallel to the user's thigh line 212 and a distance $D_{2b}$ of 134 mm to 154 mm (e.g., 142 mm to 146 mm; 144 mm) from the hip point H in a direction perpendicular to the user's thigh line 212. The third pivot axis A3 is disposed a distance $D_{3a}$ of 346 mm to 366 mm (e.g., 354 mm to 358 mm; 356 mm) from the hip point H in a direction parallel to the user's thigh line 212 and a distance $D_{3b}$ of 129 mm to 149 mm (e.g., 137 mm to 141 mm; 139 mm) from the hip point H in a direction perpendicular to the user's thigh line 212. The fourth pivot axis A4 is disposed a distance $D_{4a}$ of 153 mm to 173 mm (e.g., 161 mm to 165 mm; 163 mm) from the hip point H in a direction perpendicular to the user's torso line 210 and a distance $D_{4b}$ of 533 mm to 553 mm (e.g., 541 mm to 545 mm; 543 mm) from the hip point H in a direction parallel to the user's torso line 210.

Referring to FIG. 5, portions of the seat assembly 20 are disposed as described below when the seat 22 is in the second seat position (e.g., the zero-gravity position). The seat base 50 and the first seat bottom portion 26a are disposed in the forward position, the second seat bottom portion 26b is disposed in the raised position, the seatback 30 is disposed in the second seatback position, the calf rest 34 is disposed in the second calf rest position, and/or the headrest 32 is disposed in the second headrest position. Optionally, the calf rest extension 36 is in the extended position. In some embodiments, the seatback 30 and/or the seatback frame 82 is disposed at an angle $\alpha_1'$ of 36°-40° (e.g., 38°) relative to the longitudinal direction of the track assembly 40. In some embodiments, the first seat bottom portion 26a (e.g., a seating surface thereof) is disposed at an angle $\alpha_2$ of 20°-30° (e.g., 24°) relative to the longitudinal direction of the track assembly 40 (e.g., the same angle as when the seat 22 is in the first seat position). In some embodiments, the second seat bottom portion 26b and/or the second seat bottom frame portion 112 is disposed at an angle $\alpha_{3'}$ of 46°-50° (e.g., 48°) relative to the longitudinal direction of the track assembly 40. In some embodiments, the calf rest 34 and/or the calf rest frame 120 is disposed at an angle $\alpha_{4'}$ of 15°-19° (e.g., 17°) relative to the longitudinal direction of the track assembly 40. In some embodiments, the headrest 32 and/or the headrest frame 90 is disposed at an angle $\alpha_{5'}$ of 37°-41° (e.g., 39°) relative to the seatback 30. In some embodiments, the third pivot axis A3 is disposed a distance $D_{3d'}$ of 300 mm to 350 mm (e.g., 321 mm to 325 mm; 323 mm) from the hip point H, a distance $D_{3x'}$ of 295 mm to 345 mm (e.g., 318 mm to 322 mm; 320 mm) in front of the hip point H (e.g., in the X-direction), and/or a distance $D_{3z'}$ of 20 mm to 70 mm (e.g., 44 mm to 48 mm; 46 mm) above the hip point H (e.g., in the Z-direction). In some embodiments, the fourth pivot axis A4 is disposed a distance $D_{4d'}$ of 620 mm to 670 mm (e.g., 644 mm to 648 mm; 646 mm) from the hip point H, a distance $D_{4x'}$ of 565 mm to 615 mm (e.g., 586 mm to 590 mm; 588 mm) behind the hip point H (e.g., in the X-direction), and/or a distance $D_{4z'}$ of 240 mm to 290 mm (e.g., 265 mm to 269 mm; 267 mm) above the hip point H (e.g., in the Z-direction).

The positions of the axes A1, A2, A3, A4 when the seat 22 is in the second seat position can also be expressed by their respective distances to the hip point H in directions defined relative to the occupant/user 200 as generally illustrated in FIG. 6. In some embodiments, the first pivot axis A1 is disposed a distance $D_{1a'}$ of 192 mm to 214 mm (e.g., 200 mm to 204 mm; 202 mm) from the hip point H in a direction parallel to the user's thigh line 212 and a distance $D_{1b'}$ of 3 mm to 23 mm (e.g., 11 mm to 15 mm; 13 mm) from the hip point H in a direction perpendicular to the user's thigh line 212. In some embodiments, the second pivot axis A2 is disposed a distance $D_{2a'}$ of 65 mm to 85 mm (e.g., 73 mm to 77 mm; 75 mm) from the hip point H in a direction parallel to the user's thigh line 212 and a distance $D_{2b'}$ of 166 mm to 186 mm (e.g., 174 mm to 178 mm; 176 mm) from the hip point H in a direction perpendicular to the user's thigh line 212. In some embodiments, the third pivot axis A3 is disposed a distance $D_{3a'}$ of 289 mm to 309 mm (e.g., 297 mm to 301 mm; 299 mm) from the hip point H in a direction parallel to the user's thigh line 212 and a distance $D_{3b'}$ of 114 mm to 134 mm (e.g., 122 mm to 126 mm; 124 mm) from the hip point H in a direction perpendicular to the user's thigh line 212. In some embodiments, the fourth pivot axis A4 is disposed a distance $D_{4a'}$ of 164 mm to 184 mm (e.g., 172 mm to 176 mm; 174 mm) from the hip point H in a direction perpendicular to the user's torso line 210 and a distance $D_{4b'}$ of 612 mm to 632 mm (e.g., 620 mm to 624 mm; 622 mm) from the hip point H in a direction parallel to the user's torso line 210.

Referring to FIGS. 5, 6, 8, and 9, positioning the seat assembly 20 and/or the seat 22 according to the previously described distances and/or angles when in the first seat position and/or when in the second seat position facilitates maintaining the position of the hip point H relative to relative to the seat base 50, the first seat bottom portion 26a, the first pivot axis A1, etc. and provides an improved level of comfort for the occupant/user 200. Positioning the seat assembly 20 and/or the seat 22 according to the previously described distances and/or angles when in the first seat position and/or when in the second seat position also enables the seat assembly 20 to be used by occupants/users 200 of many different sizes without a significant reduction in comfort level.

Referring to FIGS. 13-20, a seat 22' includes a seat bottom 24', a seat bottom frame 100', and an adjustment member 150. The seat bottom 24' includes a first angled section 28a and a second angled section 28b. The seat bottom frame 100' includes a single, angled portion that is adjustable about/around the first pivot axis A1. The seat bottom 24' and/or the seat bottom frame 100' is adjustable about/around the first pivot axis A1 to a first seat bottom position (see, e.g., FIGS. 15-18 and 20) and a second seat bottom position (see, e.g., FIGS. 13, 14, 17, and 19) to adjust an angle/inclination of the seat bottom 24' and/or the seat bottom frame 100' relative to the track assembly 40, the seatback 30, and/or the seatback frame 82. The seat bottom 24' and/or the seat bottom frame 100' is disposed in the first seat bottom position when the seat 22' is in the first seat position (e.g., the design position) and is disposed in the second seat bottom position when the seat 22' is in the second seat position (e.g., the zero-gravity position).

Referring to FIGS. 13-20, the seat bottom frame 100' includes a plurality of cross-members (e.g., a first cross-member 140a and a second cross-member 140b) and a plurality of side-members (e.g., a first side-member 142a and a second side-member 142b). The side-members 142a, 142b each include a first angled portion 144a, 144b and a second angled portion 146a, 146b. The first angled portions 144a, 144b and the second angled portions 146a, 146b extend obliquely relative to one another and define an angle $\alpha_6$ of 160°-165° therebetween. The first cross-member 140a extends between and connects the two first angled portions 144a, 144b with one another. The second cross-member 140b extends between and connects the two second angled portions 146a, 146b with one another. The first angled portions 144a, 144b and the first cross-member 140a are disposed in and/or connected to the first angled section 28a of the seat bottom 24'. The second angled portions 146a, 146b and the second cross-member 140b are disposed in and/or connected to the second angled section 28b of the seat bottom 24'.

The first angled section 28a of the seat bottom 24' and/or the first angled portions 144a, 144b of the seat bottom frame 100' are pivotably connected to the rear base portions 54*a*, 54*b*, the seatback 30, and/or the seatback frame 82 at or about the first pivot axis A1. The second angled section 28*b* of the seat bottom 24' and/or the second angled portions 146*a*, 146*b* of the seat bottom frame 100' are pivotably connected to the calf rest 34 and/or the calf rest frame 120 at or about the third pivot axis A3. The second angled section 28*b* of the seat bottom 24' and/or the second angled portions 146*a*, 146*b* of the seat bottom frame 100' are adjustably connected to the front base portions 56*a*, 56*b* via the adjustment member 150.

Referring to FIGS. 13-15, 17, and 19, the adjustment member 150 adjusts the seat bottom 24' and/or the seat bottom frame 100' about/around the first pivot axis A1. The adjustment member 150 is pivotably connected to the front base portions 56*a*, 56*b* at or about the second pivot axis A2. The adjustment member 150 is pivotably and slidably connected to seat bottom frame 100' at or about a fifth pivot axis A5 (e.g., a member-bottom pivot axis). The adjustment member 150 includes a cross-member 152 and a plurality of side-members (e.g., a first side-member 154*a* and a second side-member 154*b*). The cross-member 152 and the side-members 154*a*, 154*b* may include one or more of a variety of configurations, such as a member, a beam, a bar, a rod, a tube, and/or a plate. Each of the side-members 154*a*, 154*b* is pivotably connected to one of the front base portions 56*a*, 56*b* at or about the second pivot axis A2. The cross-member 152 extends between and connects the ends of the side-members 154*a*, 154*b* opposite the second pivot axis A2. The cross-member 152 is coaxial with and defines the fifth pivot axis A5. The cross-member 152 and the fifth pivot axis A5 (e.g., a member-bottom pivot axis) extend generally in the Y-direction (e.g., perpendicular to the longitudinal direction of the track assembly 40, and/or parallel to the first, second, third, and/or fourth pivot axes A1, A2, A3, A4). The cross-member 152 and/or the side-members 154*a*, 154*b* are slidably and pivotably connected to the second angled portions 146*a*, 146*b* of the seat bottom frame 100' at or about the fifth pivot axis A5. Referring to FIGS. 13 and 15, the second angled portions 146*a*, 146*b* each include an inwardly projecting lip 148*a*, 148*b* (e.g., projecting therefrom generally in the Y-direction) that engages, contacts, and/or rests on one of the side-members 154*a*, 154*b* and/or an end of the cross-member 152.

Referring to FIGS. 13-19, the adjustment member 150 (e.g., a lever, arm, plate, etc.) is pivotable about/around the second pivot axis A2 via actuation of a motor of the seat adjuster 70 (e.g., a third motor 72*c*') to adjust an angle/inclination of the adjustment member 150, the seat bottom 24', and the seat bottom frame 100' relative to the track assembly 40, the seatback 30, and/or the seatback frame 82. The adjustment member 150 is adjustable about/around the second pivot axis A2 to a first member position (see, e.g., FIGS. 15-18) and a second member position (see, e.g., FIGS. 13, 14, 17, and 19). When the adjustment member 150 is in the first member position, the side-members 154*a*, 154*b* are disposed substantially parallel to the second angled portions 146*a*, 146*b* of the seat bottom frame 100'. When the adjustment member 150 is in the second member position, the side-members 154*a*, 154*b* extend obliquely to the second angled portions 146*a*, 146*b* of the seat bottom frame 100' and/or substantially perpendicularly to the longitudinal direction of the track assembly 40. Adjusting the adjustment member 150 to the second member position, such as from the first member position, rotates the side-members 154*a*, 154*b* about/around the second pivot axis A2 to adjust the cross-member 152 and the fifth pivot axis A5 away from the track assembly 40. This in turn causes (i) the side-members 154*a*, 154*b* and the cross-member 152 to rotate about/around the fifth pivot axis A5 relative to the seat bottom frame 100' (e.g., increasing an angle defined between the side-members 154*a*, 154*b* and the second angled portions 146*a*, 146*b*) and (ii) the side-members 154*a*, 154*b*, the cross-member 152, and the fifth pivot axis A5 to move, adjust, slide, etc. along the second angled portions 146*a*, 146*b* and/or the lips 148*a*, 148*b* thereof toward the first angled portions 144*a*, 144*b*. As such, the adjustment member 150 pushes the second angled portions 146*a*, 146*b* of the seat bottom frame 100' upward causing the seat bottom frame 100' and the seat bottom 24' to rotate about the first pivot axis A1.

In some embodiments, adjusting the seat bottom 24' about the first pivot axis A1 causes the seatback 30 and/or the seatback frame 82 to rotate about the first pivot axis A1. Optionally, the orientation of the seat bottom 24' and/or the seat bottom frame 100' relative to the seatback 30 and/or the seatback frame 82 is maintained during this adjustment (e.g., an angle defined between the seat bottom frame 100' and the seatback frame 82 remains constant). As such, adjusting the adjustment member 150 about the second pivot axis A2 (e.g., from the first member position to the second member position and/or vice versa) simultaneously rotates the seat bottom 24', the seat bottom frame 100', the seatback 30, and the seatback frame 82 about the first pivot axis A1. Optionally, in some embodiments, the seat adjuster 70 may not include the first motor 72*a* and/or the seatback 30 may not be adjustable independently of the seat bottom 24'.

Referring to FIGS. 13-20, the seat adjuster 70, the first motor 72*a*, the second motor 72*b*, the fourth motor 72*d*, the fifth motor 72*e*, and/or the sixth motor 72*f* may be configured as described above with respect to the seat assembly 20 depicted in FIGS. 1-12. The seat adjuster 70 includes a third motor 72*c*' that is operatively connected to the adjustment member 150 and at least one of the front base portions 56*a*, 56*b*. The third motor 72*c*' adjusts a position of the adjustment member 150 relative to the track assembly 40, the seat bottom 24', and/or the seat bottom frame 100' (e.g., to the first member position and/or to the second member position) when actuated by the seat adjuster 70 to, in turn, adjust a position of the seat bottom 24' and/or the seat bottom frame 100' relative to the track assembly 40, the seatback 30, and/or the seatback frame 82 (e.g., to the first seat bottom position and/or to the second seat bottom position).

The seat adjuster 70 adjusts the seat 22' to one or more seat positions, including the first seat position (e.g., a design position) and the second seat position (e.g., a zero-gravity position). When adjusting the seat 22' from the first seat position to the second seat position or vice versa, the seat adjuster 70: adjusts (e.g., recline) the seatback 30 and/or the seatback frame 82 about/around the first pivot axis A1 10°-25° (e.g., 16°-20°; 18°); adjusts the seat bottom 24' and/or the seat bottom frame 100' about the first pivot axis A1 10°-25° (e.g., 16°-20°; 18°); adjusts the adjustment member 150 about the second pivot axis A2 80°-100° (e.g., 88°-92°; 90°); adjusts the calf rest 34 and/or the calf rest frame 120 about the third pivot axis A3 20°-30° (e.g., 23°-27°; 25°); and/or adjusts the headrest 32 and/or the headrest frame 90 about the fourth pivot axis A4 10°-20° (e.g., 13°-17°; 15°). Optionally, the seat adjuster 70 simultaneously adjusts the moveable track portions 42*b*, 44*b* and the seat base 50 along the track assembly 40 in the longitudinal direction (e.g., via actuating the first motor 72*a*), the seatback 30 about the first pivot axis A1 (e.g., via actuating the second motor 72*b* and/or actuating the third motor 72*c*'), the seat bottom 24' about the first pivot axis A1 (e.g., via actuating the third motor 72c'), the adjustment member 150 about the second pivot axis A2 (e.g., via actuating the third motor 72c'), the calf rest 34 about the third pivot axis A3 (e.g., via actuating the fourth motor 72d), and/or the headrest 32 about the fourth pivot axis A4 (e.g., via actuating the fifth motor 72e) to adjust the seat 22' to the first seat position and/or to the second seat position. In some embodiments, the seat adjuster 70 simultaneously adjusts the calf rest extension 36 to the retracted position and to the extended position (e.g., via actuating the sixth motor 72f) in conjunction with the other portions of the seat 22' to adjust the seat 22' to the first seat position and to the second seat position, respectively.

Referring to FIG. 16, portions of the seat assembly 20 are disposed as described below when the seat 22' is in the first seat position (e.g., a design position). The seat base 50 is disposed in the rearward position, the adjustment member 150 is in the first member position, the seatback 30 is disposed in the first seatback position, the seat bottom 24' is in the first seat bottom position, the calf rest 34 is disposed in the first calf rest position, the headrest 32 is disposed in the first headrest position, and/or the calf rest extension 36 is in the retracted position. The seatback 30, the calf rest 34, and the headrest 32 are disposed at the angles (e.g., $\alpha_1$, $\alpha_4$, $\alpha_5$) described above with respect to FIGS. 8 and 9 and the first pivot axis A1, the second pivot axis A2, the third pivot axis A3, and the fourth pivot axis A4 are disposed at the distances (e.g., $D_{1d}$, $D_{2d}$, $D_{3d}$, $D_{4d}$) described above with respect to FIGS. 8 and 9. The first angled section 28a of the seat bottom 24' and/or the first angled portions 144a, 144b of the seat bottom frame 100' may be disposed at an angle $\alpha_7$ of 0°-5° (e.g., 0°) relative to the longitudinal direction of the track assembly 40 (e.g., extend substantially parallel to the longitudinal direction of the track assembly 40). The second angled section 28b of the seat bottom 24' and/or the second angled portions 146a, 146b of the seat bottom frame 100' may be disposed at an angle $\alpha_8$ of 16°-20° (e.g., 18°) relative to the longitudinal direction of the track assembly 40.

Referring to FIG. 14, portions of the seat assembly 20 are disposed as described below when the seat 22' is in the second seat position (e.g., a zero-gravity position). The seat base 50 is disposed in the forward position, the adjustment member 150 is in the second member position, the seatback 30 is disposed in the second seatback 30 position, the seat bottom 24' is in the second seat bottom position, the calf rest 34 is disposed in the second calf rest position, and/or the headrest 32 is disposed in the second headrest position. Optionally, the calf rest extension 36 is in the extended position. The calf rest 34 and the headrest 32 may be at the angles (e.g., $\alpha_{4'}$, $\alpha_{5'}$) described above with respect to FIGS. 5 and 6. The seatback 30 and/or the seatback frame 82 may be disposed at an angle $\alpha_{1''}$ of 41°-45° (e.g., 43°) relative to the longitudinal direction of the track assembly 40. The first angled section 28a of the seat bottom 24' and/or the first angled portions 144a, 144b of the seat bottom frame 100' may be disposed at an angle $\alpha_{7'}$ of 16°-20° (e.g., 18°) relative to the longitudinal direction of the track assembly 40. The second angled section 28b of the seat bottom 24' and/or the second angled portions 146a, 146b of the seat bottom frame 100' may be disposed at an angle $\alpha_{8'}$ of 34°-38° (e.g., 36°) relative to the longitudinal direction of the track assembly 40.

Referring to FIGS. 14 and 16, positioning the seat assembly 20' and/or the seat 22' according to the previously described distances and/or angles when in the first seat position and/or when in the second seat position provides an improved level of comfort for the occupant/user 200 relative to other designs. Positioning the seat assembly 20' and/or the seat 22' according to the previously described distances and/or angles when in the first seat position and/or when in the second seat position also enables the seat assembly 20' to be used by occupants/users 200 of many different sizes without a significant reduction in comfort level.

Figure 20:
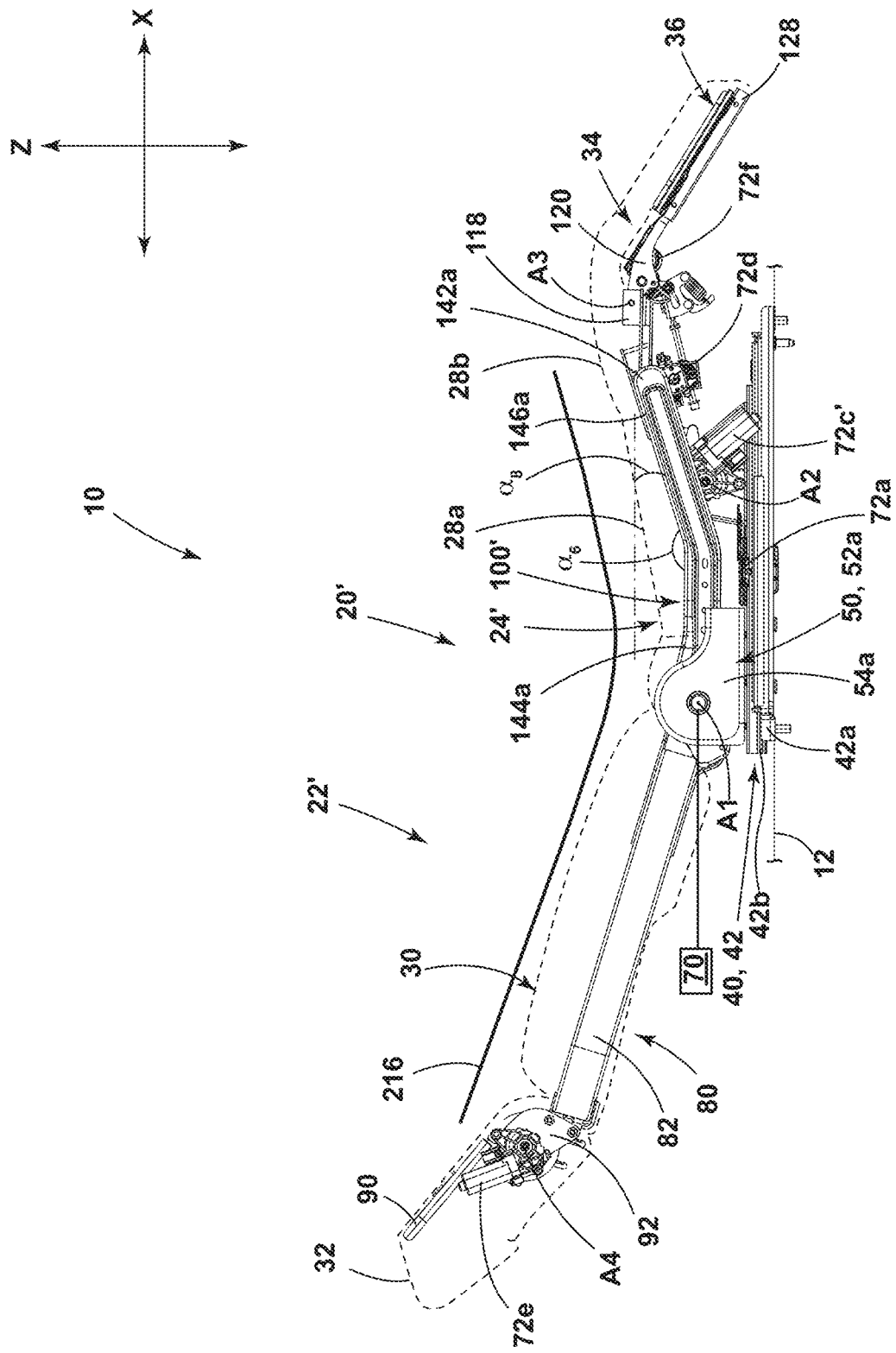

Referring to FIGS. 18-20, the seat bottom 24' and the seatback 30 of the seat 22' are both pivotable about the first pivot axis A1. The first pivot axis A1 is disposed below a seating surface of the seat bottom 24 relative to the Z-direction (e.g., the first pivot axis A1 is disposed closer to the vehicle floor 12 than the seating surface), thereby preventing the formation of a step between the seat bottom 24' and the seatback 30 (e.g., unlike the step formed in the design shown in FIG. 22) when the seat 22' is in the first seat position (see, e.g., FIG. 18), the seat 22' is in the second seat position (see, e.g., FIG. 19), and at large recline angles of the seatback 30 (see, e.g., FIG. 20). This in turn improves the comfort of the occupant/user 200 when the seat 22' is in the first seat position, the seat 22' is in the second seat position, and at large recline angles of the seatback 30 (see, e.g., FIGS. 18-20 where the posture line 216 of the occupant/user 200 is not intersected by the any portion of the seat 22').

Figure 21:
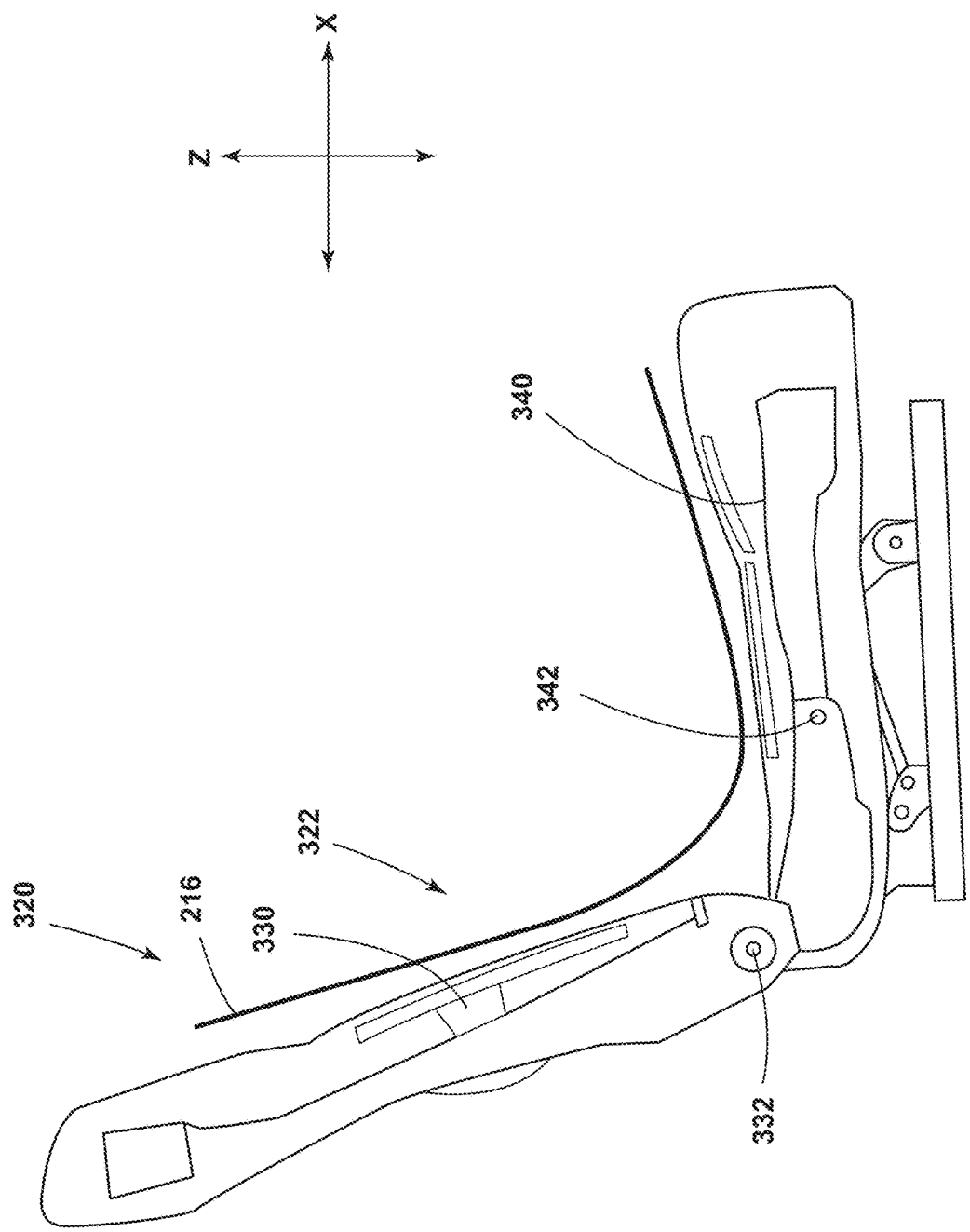
FIGS. 21 and 22 are side views generally illustrating a seat assembly with a seatback disposed at a small recline angle and a large recline angle, respectively.
Figure 22:
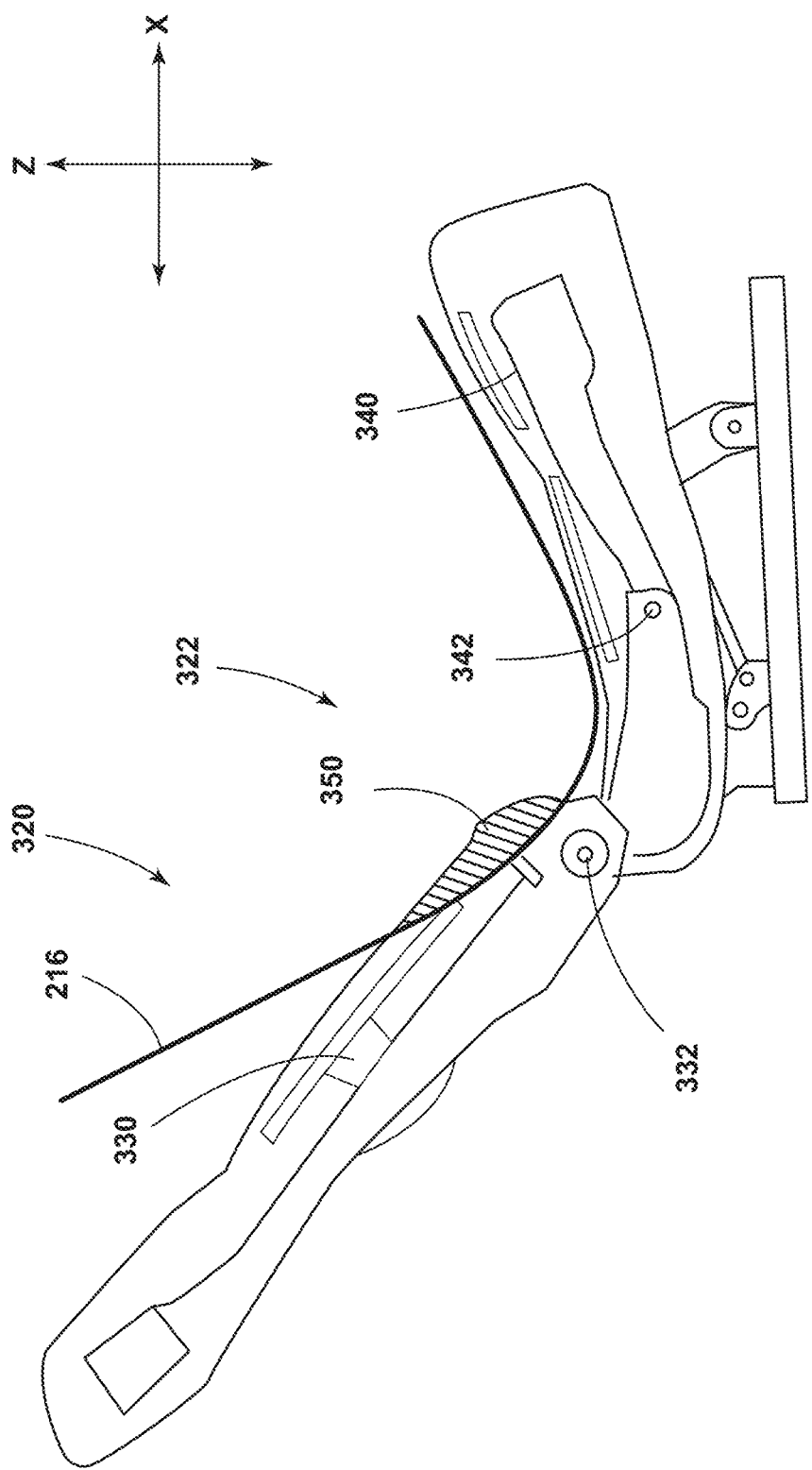

Conversely, in some designs, such as those generally illustrated in FIGS. 21 and 22, the seat 322 of the seat assembly 320 includes a seatback 330 and a seat bottom 340 that are adjustable about different axes 332, 342. The seatback 330 is adjustable about an upper axis 332. The seat bottom 340 is adjustable about a lower axis 342, which is disposed closer to a vehicle floor than the upper axis 332 (e.g., is disposed below the upper axis 332). In these designs, adjusting the seatback 330 from a small recline angle (see, e.g., FIG. 21) to a large recline angle (see, e.g., FIG. 22) results in the formation of a step 350 between the seatback 330 and the seat bottom 340. The step 350 may press into the back of an occupant/user causing discomfort (see, e.g., FIG. 22 where the posture line 216 of the occupant/user 200 is intersected by the step 350).

In examples, a seat adjuster 70 and/or a controller may include an electronic controller and/or include an electronic processor, such as a programmable microprocessor and/or microcontroller. In embodiments, a seat adjuster 70 and/or a controller may include, for example, an application specific integrated circuit (ASIC). A seat adjuster 70 and/or a controller may include a central processing unit (CPU), a memory (e.g., a non-transitory computer-readable storage medium), and/or an input/output (I/O) interface. A seat adjuster 70 and/or a controller may be configured to perform various functions, including those described in greater detail herein, with appropriate programming instructions and/or code embodied in software, hardware, and/or other medium. In embodiments, a seat adjuster 70 and/or a controller may include a plurality of controllers. In embodiments, a seat adjuster 70 and/or a controller may be connected to a display, such as a touchscreen display.

The instant disclosure includes the following non-limiting embodiments:

1. A seat assembly, comprising: a seat adjuster; and a seat including: a seat bottom connectable to a track assembly; a seatback pivotably connected to the seat bottom; a calf rest pivotably connected to the seat bottom; and a headrest pivotably connected to the seatback; wherein the seat adjuster includes one or more motors and is connected to the seat to adjust the seat to a first seat position and to a second seat position via adjusting the seatback, the calf rest, and the headrest about a plurality of pivot axes.

2. The seat assembly according to embodiment 1, wherein: the first seat position is a design position; and the second seat position is a zero-gravity position.

3. The seat assembly according to any preceding embodiment, including the track assembly and a seat base, wherein: the seat base connects the seat to the track assembly; and a hip point of a user is in the same position relative to the seat base when the seat is in the first seat position and when the seat is in the second seat position.

4. The seat assembly according to any preceding embodiment, wherein: the seat bottom includes a first seat bottom portion and a second seat bottom portion; the plurality of pivot axes includes a first pivot axis, a second pivot axis, a third pivot axis, and a fourth pivot axis; and to adjust the seat from the first seat position to the second seat position, the seat adjuster adjusts: the seatback about the first pivot axis 20°-30°; the second seat bottom portion about the second pivot axis 10°-20°; the calf rest about the third pivot axis 20°-30°; and the headrest about the fourth pivot axis 10°-20°.

5. The seat assembly according to any preceding embodiment, wherein: the seat bottom includes a first seat bottom portion and a second seat bottom portion; the plurality of pivot axes includes a first pivot axis, a second pivot axis, a third pivot axis, and a fourth pivot axis; and to adjust the seat from the first seat position to the second seat position, the seat adjuster: reclines the seatback about the first pivot axis 23°-27°; adjusts the second seat bottom portion upward about the second pivot axis 13°-17°; adjusts the calf rest upward about the third pivot axis 23°-27°; and adjusts the headrest forward about the fourth pivot axis 13°-17°.

6. The seat assembly according to any preceding embodiment, wherein the seatback is disposed at an angle of 36°-40° relative to a longitudinal direction of said track assembly when the seat is in the second seat position.

7. The seat assembly according to any preceding embodiment, wherein the calf rest is disposed at an angle of 15°-19° relative to a longitudinal direction of said track assembly when the seat is in the second seat position.

8. The seat assembly according to any preceding embodiment, wherein the headrest is disposed at an angle of 37°-41° relative to the seatback when the seat is in the second seat position.

9. The seat assembly according to any preceding embodiment, wherein: the plurality of pivot axes includes a calf rest pivot axis; the calf rest is pivotable the calf rest pivot axis; the calf rest pivot axis is disposed below a hip point of a user when the seat is in the first seat position; and the calf rest pivot axis is disposed above said hip point when the seat is in the second seat position.

10. The seat assembly according to any preceding embodiment, wherein: the plurality of pivot axes includes a first pivot axis, a second pivot axis, a third pivot axis, and a fourth pivot axis; the seat bottom includes a first seat bottom portion and a second seat bottom portion; the first seat bottom portion is connectable to said track assembly; the second seat bottom portion and the seatback are pivotably connected to the first seat bottom portion; the calf rest is pivotably connected to the second seat bottom portion; and to adjust the seat to the first seat position and to the second seat position, the seat adjuster adjusts the seatback about the first pivot axis, the second seat bottom portion about the second pivot axis, the calf rest about the third pivot axis, and the headrest about the fourth pivot axis.

11. The seat assembly according to any preceding embodiment, wherein, when the seat is in the second seat position: the seatback is disposed at an angle of 36°-40° relative to a longitudinal direction of said track assembly; the second seat bottom portion is disposed at an angle of 46°-50° relative to said longitudinal direction; the calf rest is disposed at an angle of 15°-19° relative to said longitudinal direction; and the headrest is disposed at an angle of 37°-41° relative to the seatback.

12. The seat assembly according to any preceding embodiment, wherein, when the seat is in the first seat position: the seatback is disposed at an angle of 59°-63° relative to said longitudinal direction; the second seat bottom portion is disposed at an angle of 11°-15° relative to said longitudinal direction; the calf rest is disposed at an angle of 58°-62° relative to said longitudinal direction; and the headrest is disposed at an angle of 22°-26° relative to the seatback.

13. The seat assembly according to any preceding embodiment, including the track assembly; wherein, to adjust the seat to the first seat position and/or to the second seat position, the seat adjuster simultaneously adjusts the first seat bottom portion in a longitudinal direction along the track assembly, the seatback about the first pivot axis, the second seat bottom portion about the second pivot axis, the calf rest about the third pivot axis, and the headrest about the fourth pivot axis.

14. The seat assembly according to any preceding embodiment, wherein: the track assembly includes a fixed track and a movable track; the first seat bottom portion is fixed relative to the movable track; and a hip point of a user is in the same position relative to the first seat bottom portion when the seat is in the first seat position and when the seat is in the second seat position.

15. The seat assembly according to any preceding embodiment, wherein the first pivot axis is disposed farther from a hip point of a user than the second pivot axis.

16. The seat assembly according to any preceding embodiment, wherein the first pivot axis is disposed farther below a hip point of a user than the second pivot axis.

17. The seat assembly according to any preceding embodiment, wherein the third pivot axis is disposed at least twice as far in front of a hip point of a user than the second pivot axis when the seat is in the first seat position and when the seat is in the second seat position.

18. The seat assembly according to any preceding embodiment, wherein the first seat bottom portion is disposed at an angle of 20°-30° relative to said track assembly when the seat is in the first seat position and when the seat is in the second seat position.

19. The seat assembly according to any preceding embodiment, wherein the second seat bottom portion is disposed substantially parallel to the first seat bottom portion when the seat is in the first seat position.

20. The seat assembly according to any preceding embodiment, wherein a hip point of a user is in the same position relative to the first pivot axis and the second pivot axis when the seat is in the first seat position and when the seat is in the second seat position.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises." and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

It should be understood that a computer/computing device, a controller, a seat adjuster, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A seat assembly, comprising:
   a seat adjuster; and
   a seat including:
      a seat bottom connectable to a track assembly;
      a seatback pivotably connected to the seat bottom;
      a calf rest pivotably connected to the seat bottom; and
      a headrest pivotably connected to the seatback,
      wherein the seat adjuster includes one or more motors and is connected to the seat to adjust the seat to a design position and to a zero-gravity position via adjusting the seatback, the calf rest, and the headrest about a plurality of pivot axes, and
      wherein a position of a hip point of a user relative to a portion of the seat bottom is same in the design position and the zero-gravity position based on the connection between the portion of the seat bottom supporting a hip of the user and the track assembly,
      wherein an orientation of the portion of the seat bottom is fixed with respect to the track assembly.

2. The seat assembly of claim 1, including the track assembly and a seat base, wherein the seat base connects the seat to the track assembly.

3. The seat assembly of claim 1, wherein: the seat bottom includes a first seat bottom portion and a second seat bottom portion, the first seat bottom portion corresponds to the portion of the seat bottom,
   the plurality of pivot axes includes a first pivot axis, a second pivot axis, a third pivot axis, and a fourth pivot axis, and
   to adjust the seat from the design position to the zero-gravity position, the seat adjuster adjusts:
      the seatback about the first pivot axis at an angle within a range of 20°-30°,
      the second seat bottom portion about the second pivot axis at an angle within a range of 10°-20°,
      the calf rest about the third pivot axis at an angle within a range of 20°-30°, and
      the headrest about the fourth pivot axis at an angle within a range of 10°-20°.

4. The seat assembly of claim 1, wherein: the seat bottom includes a first seat bottom portion and a second seat bottom portion,
   the plurality of pivot axes includes a first pivot axis, a second pivot axis, a third pivot axis, and a fourth pivot axis, and
   to adjust the seat from the design position to the zero-gravity position, the seat adjuster:
      reclines the seatback about the first pivot axis at an angle within a range of 23°-27°,
      adjusts the second seat bottom portion upward about the second pivot axis at an angle within a range of 13°-17°,
      adjusts the calf rest upward about the third pivot axis at an angle within a range of 23°-27°, and
      adjusts the headrest forward about the fourth pivot axis at an angle within a range of 13°-17°.

5. The seat assembly of claim 1, wherein the seatback is disposed at an angle within a range of 36°-40° relative to a longitudinal direction of the track assembly when the seat is in the zero-gravity position.

6. The seat assembly of claim 1, wherein the calf rest is disposed at an angle within a range of 15°-19° relative to a longitudinal direction of the track assembly when the seat is in the zero-gravity position.

7. The seat assembly of claim 1, wherein the headrest is disposed at an angle within a range of 37°-41° relative to the seatback when the seat is in the zero-gravity position.

8. The seat assembly of claim 1, wherein: the plurality of pivot axes includes a calf rest pivot axis,
   the calf rest is pivotable the calf rest pivot axis,
   the calf rest pivot axis is disposed below the hip point of a user when the seat is in the design position, and
   the calf rest pivot axis is disposed above the hip point when the seat is in the zero-gravity position, wherein the design position corresponds to a position of an average sized adult user seated in a predefined location and orientation determined based on design of the seat assembly.

9. The seat assembly of claim 1, wherein: the plurality of pivot axes includes a first pivot axis, a second pivot axis, a third pivot axis, and a fourth pivot axis,
   the seat bottom includes a first seat bottom portion and a second seat bottom portion; the first seat bottom portion is connectable to the track assembly,
   the second seat bottom portion and the seatback are pivotably connected to the first seat bottom portion,
   the calf rest is pivotably connected to the second seat bottom portion, and
   to adjust the seat to the design position and to the zero-gravity position, the seat adjuster adjusts the seatback about the first pivot axis, the second seat bottom portion about the second pivot axis, the calf rest about the third pivot axis, and the headrest about the fourth pivot axis.

10. The seat assembly of claim 9, wherein, when the seat is in the zero-gravity position:
    the seatback is disposed at an angle within a range of 36°-40° relative to a longitudinal direction of the track assembly,
    the second seat bottom portion is disposed at an angle within a range of 46°-50° relative to the longitudinal direction,
    the calf rest is disposed at an angle within a range of 15°-19° relative to the longitudinal direction, and
    the headrest is disposed at an angle within a range of 37°-41° relative to the seatback.

11. The seat assembly of claim 10, wherein, when the seat is in the design position:
    the seatback is disposed at an angle within a range of 59°-63° relative to the longitudinal direction,
    the second seat bottom portion is disposed at an angle within a range of 11°-15° relative to the longitudinal direction,
    the calf rest is disposed at an angle within a range of 58°-62° relative to the longitudinal direction, and
    the headrest is disposed at an angle within a range of 22°-26° relative to the seatback.

12. The seat assembly of claim 9, including the track assembly, wherein, to adjust the seat to one of the design position or to the zero-gravity position, the seat adjuster simultaneously adjusts:

the first seat bottom portion in a longitudinal direction along the track assembly, the seatback about the first pivot axis,
the second seat bottom portion about the second pivot axis, and
the calf rest about the third pivot axis, and the headrest about the fourth pivot axis.

13. The seat assembly of claim 12, wherein the track assembly includes a fixed track and a movable track,
the first seat bottom portion is fixed relative to the movable track.

14. The seat assembly of claim 9, wherein the first pivot axis is disposed farther from the hip point of the user than the second pivot axis.

15. The seat assembly of claim 9, wherein the first pivot axis is disposed farther below the hip point of a user than the second pivot axis.

16. The seat assembly of claim 9, wherein the third pivot axis is disposed at least twice as far in front of the hip point of a user than the second pivot axis when the seat is in the design position and when the seat is in the zero-gravity position.

17. The seat assembly of claim 9, wherein the first seat bottom portion is disposed at an angle within a range of 20°-30° relative to the track assembly when the seat is in the design position and when the seat is in the zero-gravity position.

18. The seat assembly of claim 17, wherein the second seat bottom portion is disposed substantially parallel to the first seat bottom portion when the seat is in the design position.

19. The seat assembly of claim 9, wherein a position of the hip point of a user relative to the first pivot axis and the second pivot axis is same in the design position and in the zero-gravity position.

\* \* \* \* \*